(12) United States Patent
Masuko et al.

(10) Patent No.: US 10,282,731 B2
(45) Date of Patent: May 7, 2019

(54) INFORMATION PROCESSING DEVICE, METHOD, SYSTEM, AND PROGRAM FOR DISPLAYING IMAGE OBJECT INDICATING DISPLAY MODE BASED ON PURCHASE HISTORY INFORMATION

(75) Inventors: Soh Masuko, Shinagawa-ku (JP); Hiroshi Abe, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 175 days.

(21) Appl. No.: 13/577,326

(22) PCT Filed: Mar. 31, 2011

(86) PCT No.: PCT/JP2011/058297
§ 371 (c)(1),
(2), (4) Date: Aug. 6, 2012

(87) PCT Pub. No.: WO2011/125884
PCT Pub. Date: Oct. 13, 2011

(65) Prior Publication Data
US 2012/0310773 A1    Dec. 6, 2012

(30) Foreign Application Priority Data
Mar. 31, 2010 (JP) .................................. 2010-080903

(51) Int. Cl.
*G06Q 30/00* (2012.01)
*G06Q 30/02* (2012.01)
*G06Q 30/06* (2012.01)

(52) U.S. Cl.
CPC ......... *G06Q 30/00* (2013.01); *G06Q 30/0207* (2013.01); *G06Q 30/0224* (2013.01); *G06Q 30/0239* (2013.01); *G06Q 30/0643* (2013.01)

(58) Field of Classification Search
CPC .......... G06Q 30/0631; G06Q 30/0643; G06Q 30/0601–30/0645; G06Q 30/00; G06Q 30/0207; G06Q 30/06–30/08
(Continued)

(56) References Cited

U.S. PATENT DOCUMENTS 7,136,830 B1 * 11/2006 Kuelbs et al. ............... 705/26.2
7,660,749 B2    2/2010 Koski
(Continued)

FOREIGN PATENT DOCUMENTS

CN    101493920 A    7/2009
EP    1172988 A2    1/2002
(Continued)

OTHER PUBLICATIONS

Yahoo! Japan "Yuryo Kokyaku Muke Tokuten Program 'Star Club' o Donyu", [online] Oct. 15, 2009 [retrieval date Jun. 15, 2011], Internet <URL:http://pr.yahoo.co.jp/release/2009/1015b/html>.
(Continued)

Primary Examiner — Ethan D Civan
(74) Attorney, Agent, or Firm — Sughrue Mion, PLLC

(57) ABSTRACT

The present invention includes acquiring purchase history information related to a product purchased by a user, from a storage means that stores the purchase history information (S2), generating and acquiring an image object indicating a display mode which changes in response to purchase history information (S3), generating a web page which displays the image object, and transmitting the web page to a terminal device through a network and displaying the web page (S5).

27 Claims, 17 Drawing Sheets

(58) Field of Classification Search
USPC .......................................... 705/26, 26.1–27.2
See application file for complete search history.

(56) References Cited

U.S. PATENT DOCUMENTS

| | | | |
|---|---|---|---|
| 2002/0010625 A1* | 1/2002 | Smith | G06Q 30/02 705/14.52 |
| 2003/0210279 A1 | 11/2003 | Masuda | |
| 2008/0010131 A1* | 1/2008 | Bridges | G06Q 30/02 705/14.34 |
| 2009/0138342 A1* | 5/2009 | Otto | G06Q 30/02 706/45 |
| 2009/0187597 A1* | 7/2009 | Kamada | G06Q 30/02 |
| 2011/0202406 A1* | 8/2011 | Suomela | 705/14.52 |

FOREIGN PATENT DOCUMENTS

| | | | |
|---|---|---|---|
| JP | 2000207333 A | 7/2000 | |
| JP | 2002352134 A | 12/2002 | |
| JP | 2007-179504 A | 7/2007 | |
| JP | 2008-287508 A | 11/2008 | |
| JP | 2008-293063 A | 12/2008 | |
| JP | 2009-175807 A | 8/2009 | |
| JP | 4368388 B2 | 11/2009 | |
| KR | 10-2005-0017534 A | 2/2005 | |
| KR | 20090039962 A | 4/2009 | |

OTHER PUBLICATIONS

International Search Report for PCT/JP2011/058297 dated Jun. 28, 2011.
Shoubu, "Computer programming skills and maintenance: Shopping Cart with Ajax Technology" 11th, Nov. 30, 2007 (see p. 3, col. 1, lines 29-41, and p. 5, col. 2, lines 12-15).
Pangya Series 4; (eagles blog), http://ahines.egloos.com/4257086; Mar. 30, 2008.
English Translation of Korean Office Action, Application No. 10-2015-7023364; dated Jun. 17, 2016.
"Second Life Industrial Potential," NAVER Corporation blog, Jul. 2007; 2 pages total.
"Gold Member," NAVER Corporation blog, Aug. 2009; 1 page total.
"Grade Avatar," NAVER Corporation blog, Oct. 2009; 3 pages total.
Pangya Series 4 (eagles blog), http://ahines.egloos.com/4257086 (Mar. 30, 2008). Cited in Korean Office Action dated Nov. 14, 2014 issued in corresponding Korean Patent Application No. 10-2012-7023203.

* cited by examiner

| USER ID | IMAGE OBJECT NUMBER | PRODUCT ID | PRICE |
|---|---|---|---|
| 00123 | 3 | 00001 | 870 |
| | | 10010 | 1480 |
| | | 21235 | 1990 |
| | | 32202 | 3500 |
| 12345 | 0 | 58692 | 1000 |
| | | 71034 | 2980 |
| | | 56842 | 3980 |
| | | 35712 | 4500 |
| ... | ... | ... | ... |

FIG.6

| IMAGE OBJECT | RANK |
|:---:|:---:|
|  | SILVER |
| 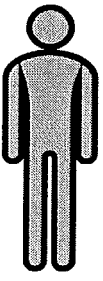 | GOLD |
| 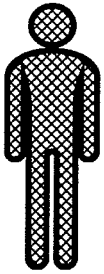 | PLATINUM |
FIG.17

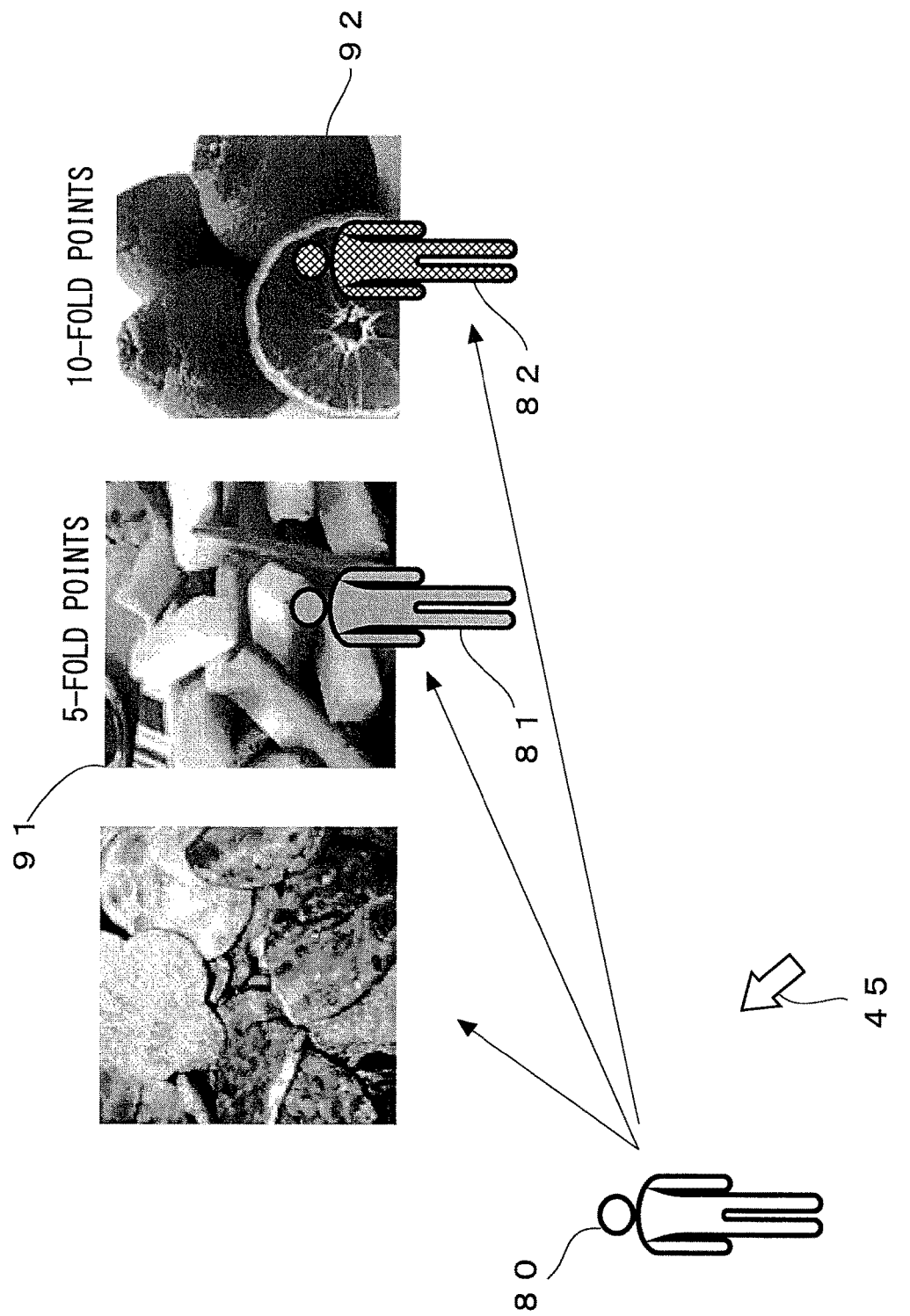

INFORMATION PROCESSING DEVICE, METHOD, SYSTEM, AND PROGRAM FOR DISPLAYING IMAGE OBJECT INDICATING DISPLAY MODE BASED ON PURCHASE HISTORY INFORMATION

CROSS REFERENCE TO RELATED APPLICATIONS

This application is a National Stage of International Application No. PCT/JP2011/058297 filed Mar. 31, 2011, claiming priority based on Japanese Patent Application No. 2010-080903 filed Mar. 31, 2010, the contents of all of which are incorporated herein by reference in their entirety.

TECHNICAL FIELD

The present invention relates to a technical field of an information processing device, an information processing method, an information processing system, an information processing program and a storage medium which process information related to a product at a shopping site on Internet.

BACKGROUND ART

A device of a display screen is made to give an atmosphere of a real store for a virtual store such as an online store which sells products on the Internet or a purchase procedure is completed by way of clicking of a mouse in order to improve users' convenience and promote sales. Patent Document 1 discloses online store visitors' activity displaying method of displaying an existence of a first visitor to an online store, receiving information related to an activity of a second visitor, and displaying the activity of the second visitor to the first visitor.

CITATION LIST

Patent Document

Patent Document 1: U.S. Pat. No. 7,660,749

SUMMARY OF THE INVENTION

Problem to be Solved by the Invention

Meanwhile, conventional online stores disclosed in Patent Document 1 make it difficult for users to recognize, at a glance, purchase history information related to a purchase history as to what product users purchased, with what amount of money the users purchased the products and how much points have been accumulated.

The present invention is made in light of this problem, and an example of an object of the present invention is to provide, for example, an information processing device which can recognize purchase history information related to a purchase history of a user for which an image is created when, for example, the user purchases a product.

Means for Solving the Problem

In order to solve the above problem, an aspect of an embodiment includes: a purchase history information acquiring means that acquires purchase history information related to a product purchased by a user from a storage means that stores the purchase history information; an image object generating means that generates an image object indicating a display mode which changes in response to the purchase history information; a web page generating means that generates a web page which displays the image object; and a transmitting means that transmits the web page to a terminal device through a network.

The information processing device may further include an obtainment image object generating means that generates an obtainment image object which is the image object to be acquired in response to purchase history information in case that a user purchases a product shown on the web page, and the web page generating means generates a web page which displays the image object and the obtainment image object.

The information processing device may further include a point information acquiring means that acquires as the purchase history information point information related to a point assigned to a product purchased by a user, and the image object generating means generates an image object indicating a display mode which changes in response to the point information.

In the information processing device, the image object generating means may generate an image object having a shape in response to the purchase history information.

In the information processing device, the image object generating means may generate an image object having a color in response to the purchase history information.

In the information processing device, the image object generating means may generate as an image object indicating a display mode which changes in response to purchase history information the image object to which an image imitating a product purchased by a user is added.

In the information processing device, the image object generating means may generate an image object based on attributes of the user.

In the information processing device, the image object generating means may generate the image object which adopts a display mode of a default state.

In the information processing device, the image object generating means may generate an image object which adopts a display mode in response to a product category used by the user.

An aspect of another embodiment provides an information processing method of processing information in an information processing device that includes: a purchase history information acquiring step of acquiring purchase history information related to a product purchased by a user from a storage means that stores the purchase history information; an image object generating step of generating an image object indicating a display mode which changes in response to the purchase history information; a web page generating step of generating a web page which displays the image object; and a transmitting step of transmitting the web page to a terminal device through a network.

The information processing system may have: an information processing device that processes information; and a terminal device connected to the information processing device through a network, and the information processing device includes: a purchase history information acquiring means that acquires purchase history information related to a product purchased by a user from a storage means that stores the purchase history information; an image object generating means that generates an image object indicating a display mode which changes in response to the purchase history information; a web page generating means that generates a web page which displays the image object; and a transmitting means that transmits the web page to a terminal device through a network.

An aspect of another embodiment causes a computer to execute: a purchase history information acquiring step of acquiring purchase history information related to a product purchased by a user from a storage means that stores the purchase history information; an image object acquiring step of acquiring an image object indicating a display mode which changes in response to the purchase history information; and a display step of causing the image object to be displayed on a web page displayed on the terminal device.

In the information processing program, the information processing program may further include an obtainment image object acquiring step of acquiring an obtainment image object which is the image object to be acquired in response to purchase history information in case that a user purchases a product shown on the web page, and the display step includes causing the image object and the obtainment image object to be displayed on the web page.

In the information processing program, the information processing program may further include an image object moving step of moving the image object on the web page based on an input from an operation unit of the terminal device, and the display step causes the obtainment image object to be displayed on the web page when the image object moves to a product image of the product in the image object moving step.

In the information processing program, the information processing program may cause the computer to further execute: an image object moving step of moving the image object on the web page based on an input from an operation unit of the terminal device; and a product registering step of, when the image object moves to a product image of the product in the image object moving step, registering the product in a to-purchase list.

In the information processing program, the information processing program may cause the computer to further execute: an image object moving step of moving the image object on the web page based on an input from an operation unit of the terminal device; and a product registering step of, when the image object moves to the obtainment image object in the image object moving step, registering the product in a to-purchase list.

In the information processing program, the information processing program may cause the computer to further execute: an image moving step of moving a product image included in the web page on the web page based on an input from an operation unit of the terminal device; and a product registering step of, when the product image moves to the image object in the image object moving step, registering a product shown by the product image in a to-purchase list.

In the information processing program, the information processing program may further include a point information acquiring step of acquiring as the purchase history information point information related to a point assigned to a product purchased by a user, and the image object acquiring step includes acquiring an image object indicating a display mode which changes in response to the point information.

In the information processing program, the image object acquiring step may include acquiring of an image object having a shape in response to the purchase history information.

In the information processing program, the image object acquiring step may include acquiring of an image object having a color in response to the purchase history information.

In the information processing program, the image object acquiring step may include acquiring of the image object to which an image imitating a product purchased by a user is added as an image object indicating a display mode which changes in response to purchase history information.

In the information processing program, the image object acquiring step may include acquiring of an image object based on attributes of the user.

In the information processing program, the image object acquiring step may include acquiring of the image object which adopts a display mode of a default state.

An aspect of another embodiment includes an information processing program recorded thereon which causes a computer to execute: a purchase history information acquiring step of acquiring purchase history information related to a product purchased by a user, from a storage means that stores the purchase history information; an image object acquiring step of acquiring an image object indicating a display mode which changes in response to the purchase history information; and a display step of causing the image object to be displayed on a web page displayed on the terminal device.

Effect of the Invention

According to the present invention, it is possible for a user to recognize purchase history information related to a purchase history of the user when, for example, the user purchases a product, by acquiring the purchase history information related to the product purchased by the user from a storage means that stores the purchase history information, acquiring an image object indicating a display mode which changes in response to the purchase history information and causing the image object to be displayed on a web page displayed on a terminal device.

BRIEF DESCRIPTION OF THE DRAWINGS

FIG. 6 illustrates a schematic diagram that illustrates an example of a table showing an image object of each member stored in a member DB in FIG. 2.

FIG. 17 illustrates a schematic diagram that illustrates a table of a relationship between an image object and a rank.

FIG. 18 illustrates a schematic diagram that illustrates a modified example of a web page displayed on the user terminal in FIG. 1.

MODES FOR CARRYING OUT THE INVENTION

Hereinafter, an embodiment of the present invention will be described with reference to the drawings. In addition, the embodiment will be described where the present invention is applied to an information processing system.

[1. Outline of Configuration and Function of Information Processing System]

First, an outline of a configuration and functions of an information processing system according to an embodiment of the present invention will be described using FIG. 1.

Figure 1:
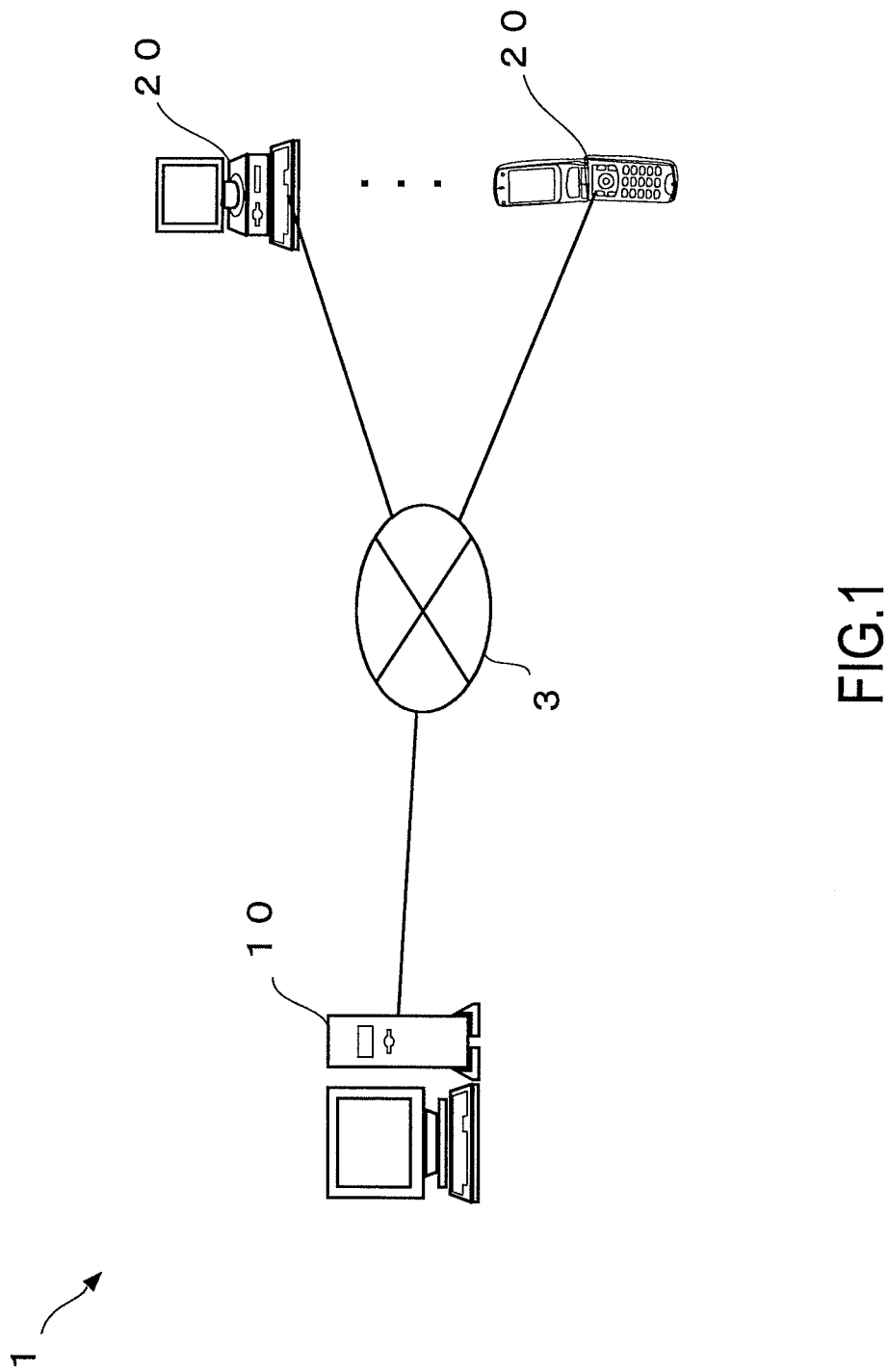
FIG. 1 illustrates a schematic diagram that illustrates a schematic configuration example of an information processing system according to an embodiment of the present invention.

FIG. 1 is a schematic diagram that illustrates a schematic configuration example of an information processing system 1 according to the present embodiment.

As illustrated in FIG. 1, the information processing system 1 has a shopping server (an example of an information processing device) 10 installed to run a shopping site, and user terminals (an example of a terminal device) 20 of users who, for example, purchase products at the shopping site.

The shopping server 10 and the user terminals 20 are connected through a network 3, and, for example, can transmit and receive data to and from each other using, for example, TCP/IP for a communication protocol. In addition, the network 3 is constructed with, for example, Internet, a dedicated communication line (for example, CATV (Community Antenna Television) line), a mobile communication network (including, for example, base stations) and a gateway.

The shopping server 10 functions as, for example, a web server or a database server for selling products at a shopping site, and performs various processings of accepting registration of products from store terminals (not illustrated) of store owners who list stores at the shopping site, registering users of the user terminals 20, handling, for example, product purchase procedures and assigning points in response to purchase of products. Further, the shopping server 10 provides an image object which matches point information and which is displayed on a web page, and provides an image object (obtainment image object) obtained in response to purchase history information such as points assigned based on a purchased product when a user purchases a product identified by a product image included in the web page.

Each user terminal 20 used by a user is, for example, a personal computer, or a mobile terminal such as a mobile wireless telephone or a PDA. The user uses the user terminal 20 to search for a product, look at a web page on which product information and an image object are displayed together with purchase the product.

[2. Configuration and Function of Server and the Like]

[2.1 Configuration and Function of Shopping Server 10)

Next, a configuration and functions of the shopping server 10 will be described using FIG. 2.

Figure 2:
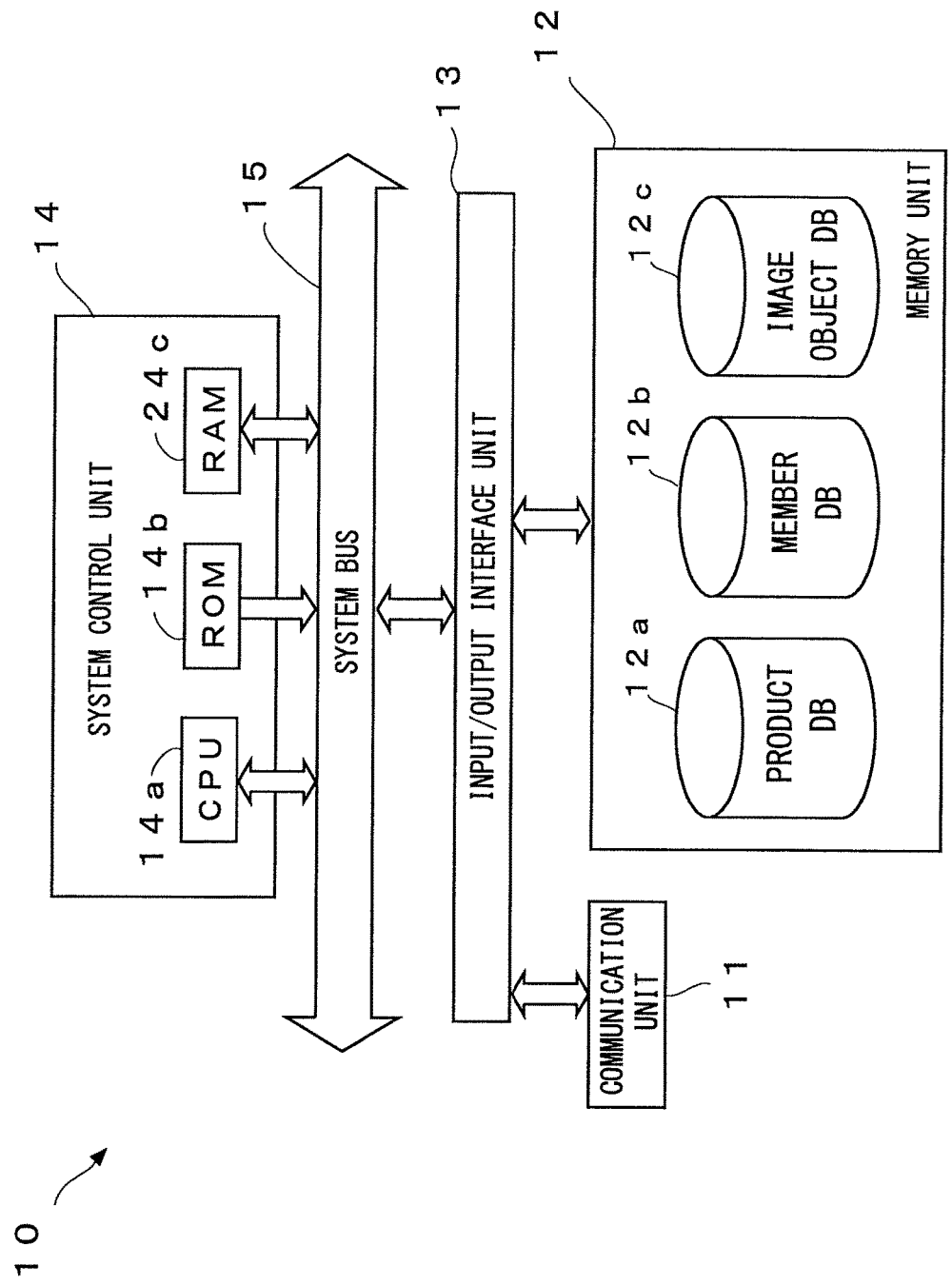
FIG. 2 illustrates a block diagram that illustrates an example of a schematic configuration of a shopping server in FIG. 1.

FIG. 2 is a block diagram that illustrates an example of a schematic configuration of the shopping server 10.

As illustrated in FIG. 2, the shopping server 10 which functions as a computer has a communication unit 11, a memory unit 12 which is an example of a storage means, an input/output interface unit 13 and a system control unit 14. Further, the system control unit 14 and the input/output interface unit 13 are connected through a system bus 15.

The communication unit 11 connects to the network 3 and controls a communication states with, for example, the user terminals 20, or connects to a local area network and transmits and receives data to and from another server on the local area network.

The memory unit 12 is configured to include, for example, a hard disk drive, and stores various programs such as an operating system and a server program and data. In addition, for example, the various programs may be acquired from another server device through the network 3, or may be recorded in a storage medium and read through a drive device.

Further, in the memory unit 12, a product database (hereinafter, "product DB") 12a, a member database (hereinafter, "member DB") 12b and an image object database (hereinafter, "image object DB") 12c which stores image objects of various modes are constructed.

In the product DB 12a, product information including a product name, a type, a product image, a specification, a price and a summary of introduction of the product, and advertisement information are stored in association with a product ID which is an identifier for identifying a product. Further, in the product DB 12a, files of web pages described, for example, by a markup language such as HTML (Hyper-Text Markup Language) or XML (Extensible Markup Language) are stored.

In the member DB 12b, user information including a user ID, a name, an address, a telephone number and an electronic mail address of a user (a user of a shopping site) registered as a member, user attributes such as the sex and the age of a user, and points the user has earned is registered. Further, payment information such as a credit card number of a user is stored as user information. This user information can be identified per user based on a user ID. Further, in the member DB 12b, a user ID, a log-in ID and a password which a user is required to log in a shopping site from the user terminal 20 are registered. Meanwhile, the log-in ID and the password are log-in information used for log-in processing (user authentication processing).

In the image object DB 12c, a character imitating a human shape which is an example of an image object displayed on a web page is stored. In the image object DB 12c, various modes of characters in response to user attributes such as the sex and the age of a user are stored. Further, a series of a plurality of characters are associated with points peruser attribute and stored in the image object DB 12c to change a character in response to points a user has obtained, make a character grow or add something to a character. In addition, for example, an image object may be a shape such as an animal, a flower or a car other than a human shape, a figure or a symbol.

Meanwhile, in the image object DB 12c, an image object which grows up in response to points to be obtained is assigned an image object number in a growth order and stored.

In addition, scripts for displaying an image object on a web page and moving this image object based on an operation of the user terminal 20 are embedded in part of web pages stored in the product DB 12a. Although these scripts are described, for example, by known JAVA (registered trademark) or CGI (Common Gateway Interface), these scripts are by no means limited to this and can be selected at random. Further, details of these scripts are known techniques, and therefore will not be described in detail.

Further, in the member DB 12B, an image object number of an image object in response to the current number of points, a product ID of a product presented to a user and a price or points associated with the product ID are associated with the user ID and stored.

Next, the input/output interface unit 13 performs interface processing between the communication unit 11 and the memory unit 12, and the system control unit 14.

The system control unit 14 is configured to include, for example, a CPU (Central Processing Unit) 14a, a ROM (Read Only Memory) 14b, and a RAM (Random Access Memory) 14c. When the CPU 14a reads and executes various programs stored in the ROM 14b and the memory unit 12, the system control unit 14 transmits a web page based on a request from the user terminal 20, processes purchase of a product by a user and records point information per user ID. Further, the system control unit 14 acquires an image object in response to points, from the image object DB 12c.

(2.2 Configuration and Function of User Terminal 20)

Next, a configuration and functions of the user terminal 20 will be described using FIG. 3.

Figure 3:
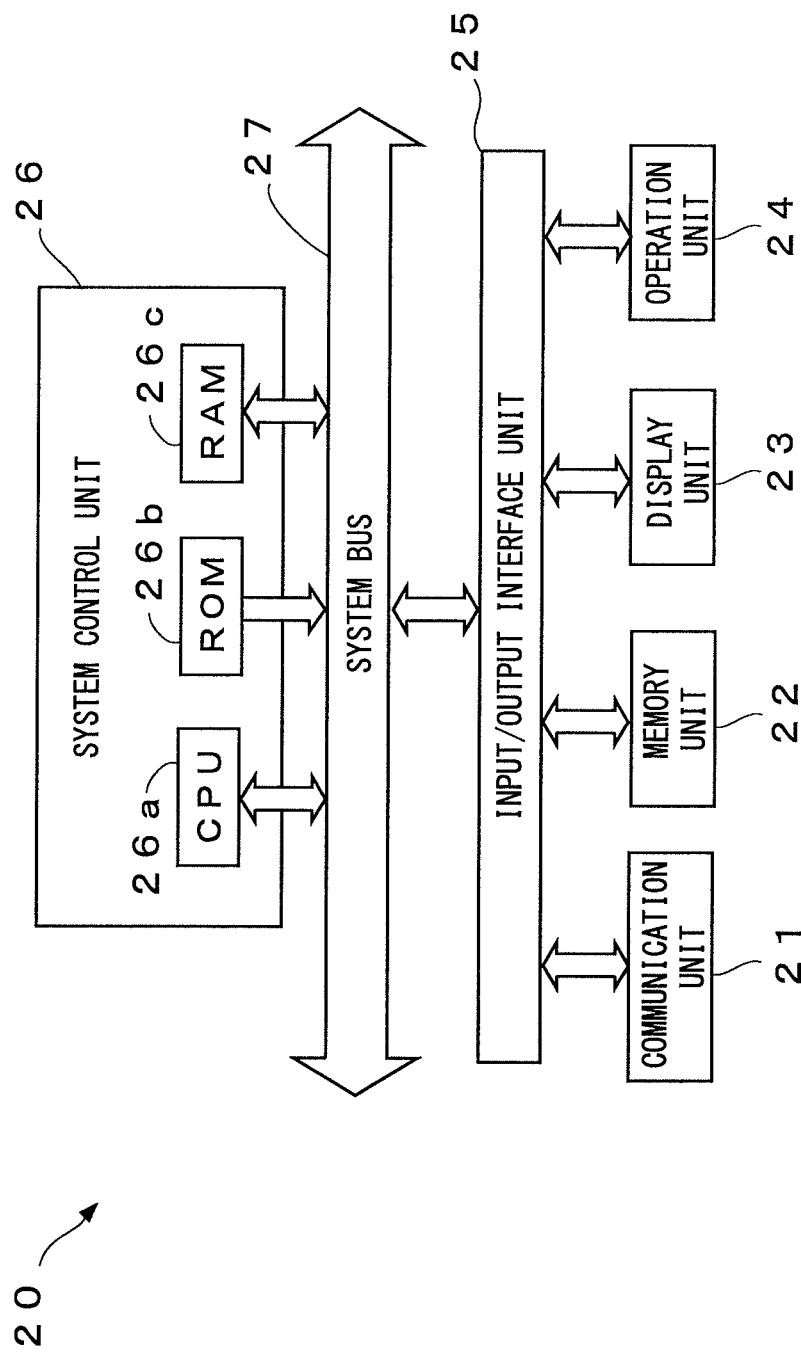
FIG. 3 illustrates a block diagram that illustrates an example of a schematic configuration of a user terminal in FIG. 1.

FIG. 3 is a block diagram that illustrates an example of a schematic configuration of the user terminal 20.

As illustrated in FIG. 3, the user terminal 20 which functions as a computer has a communication unit 21, a memory unit 22 which is an example of a storage means, a display unit 23, an operation unit 24, an input/output interface unit 25 and a system control unit 26. Further, the system control unit 26 and the input/output interface unit 25 are connected through a system bus 27.

The communication unit 21 controls, for example, a communication state with, for example, the shopping server 10 through the network 3. In addition, when the user terminal 20 is a mobile wireless telephone, the communication unit 21 has a wireless communication function for connecting to a mobile communication network of the network 3.

The memory unit 22 has, for example, a hard disk drive, and stores, for example, an operating system and a web browser program.

The display unit 23 is formed with, for example, liquid crystal display elements or EL (Electro Luminescence) elements. IN the display unit 23, a pointer which moves by a mouse operation, a web page which is acquired from the shopping server 10 and includes image objects, and a web page of a payment screen are displayed.

The operation unit 24 has, for example, a keyboard and a mouse. Through thee operation unit 24, data for user registration is inputted, and an image object displayed on the display unit 23 is moved. In addition, when the display unit 23 is a display panel of a touch switch system such as a touch panel, the operation unit 24 acquires information about a position on the display unit 23 which the user contacts or comes close to.

The input/output interface unit 25 performs interface processing between the communication unit 21 and the memory unit 22, and the system control unit 26.

The system control unit 26 has, for example, a CPU26a, a ROM 26b and a RAM26c which is an example of a storage means. Further, when the CPU 26a reads and executes various programs stored in the ROM 26b, RAM 26c and the memory unit 22, or executes the acquired script, the system control unit 26 controls the display unit 23 to display a web page acquired from the shopping server 10, or moves an image object displayed on a web page of the display unit 23 based on information of the operation unit 24.

[3. Operation of Information Processing System]

Next, an operation of the information processing system 1 according to the present embodiment will be described using FIGS. 4 to 8.

Figure 4:
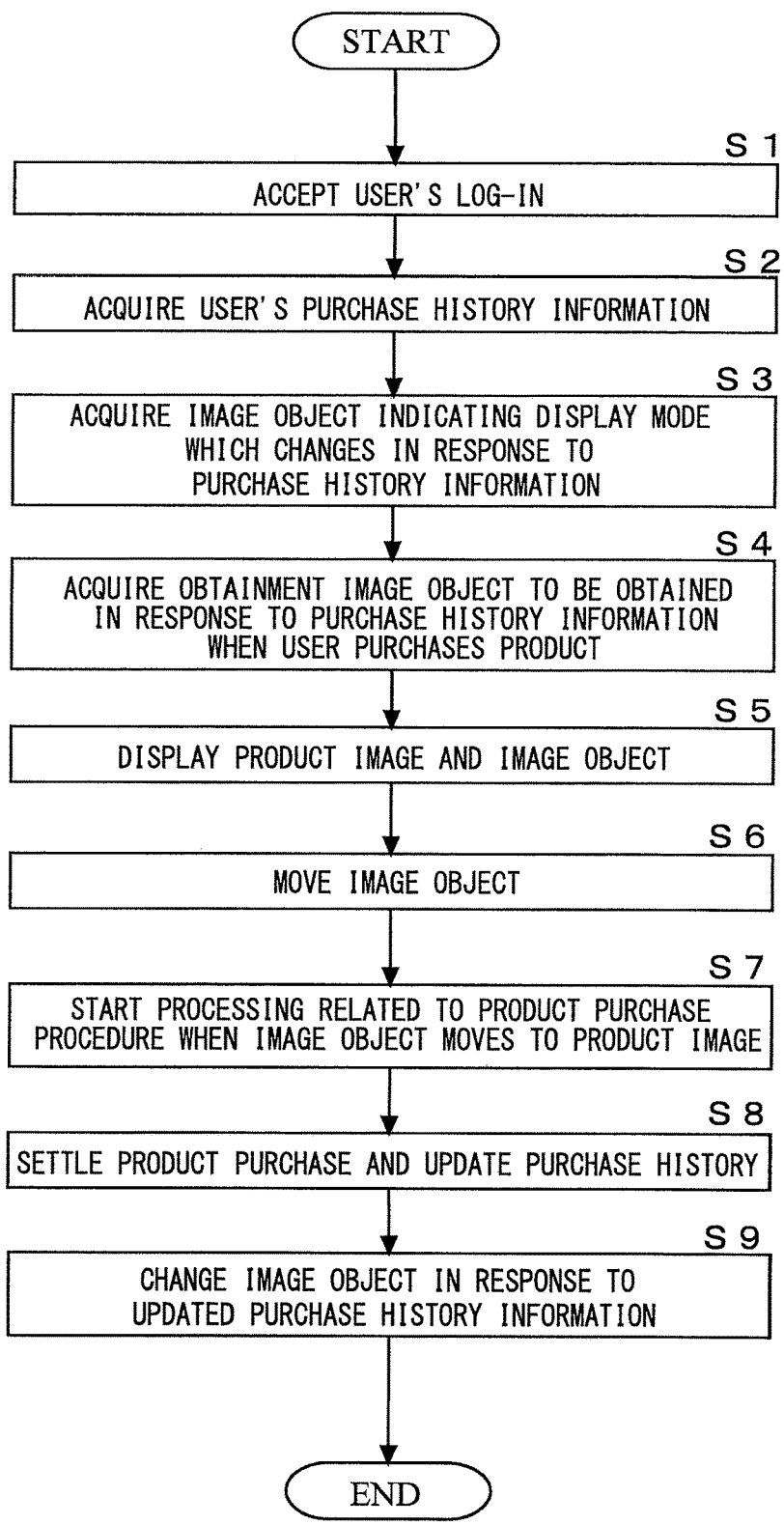
FIG. 4 is a flowchart that illustrates an operation example of the shopping server in FIG. 1.
Figure 5:
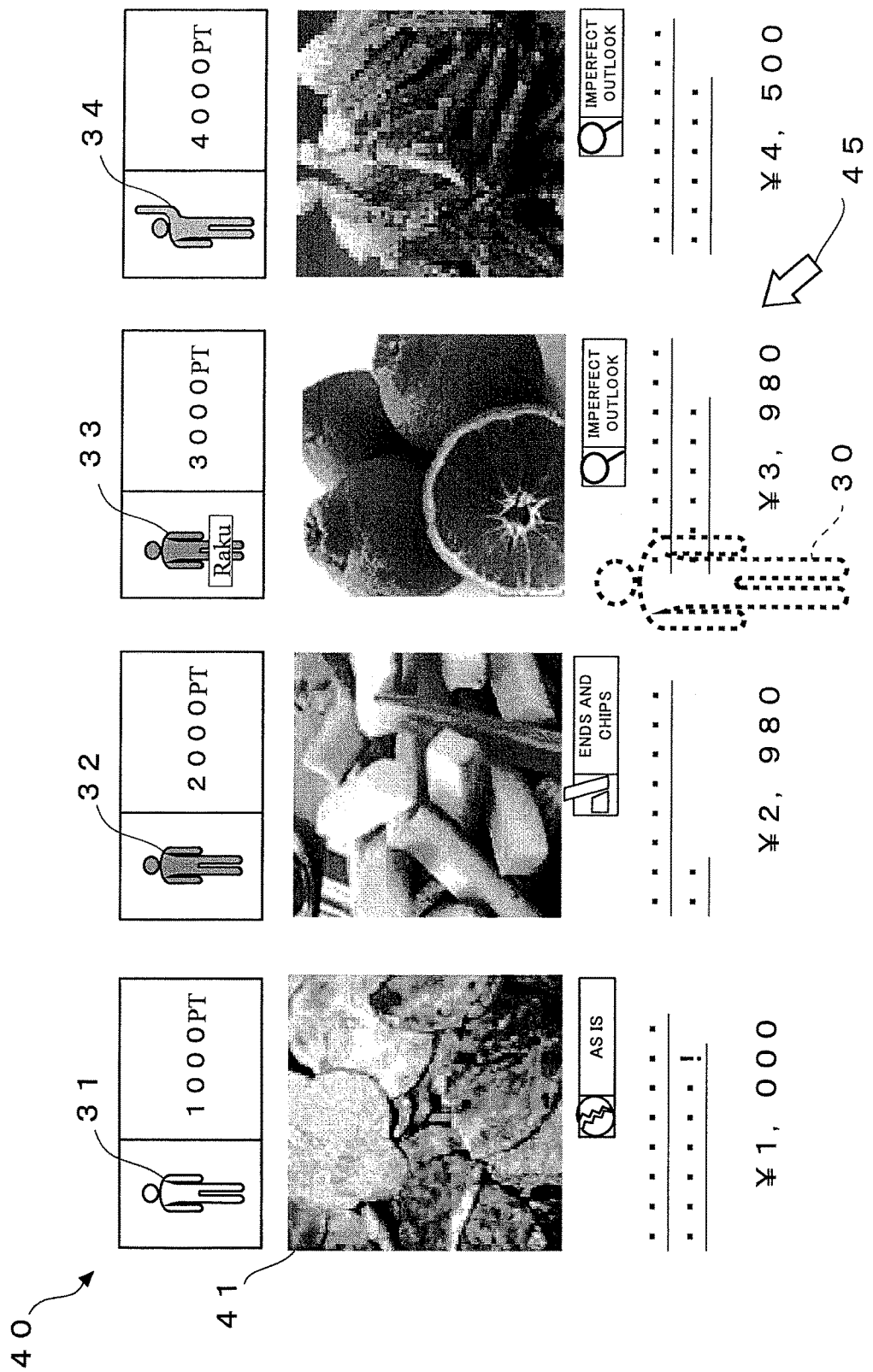
FIG. 5 illustrates a schematic diagram that illustrates an example of a web page displayed on a user terminal in FIG. 1.
Figure 7:
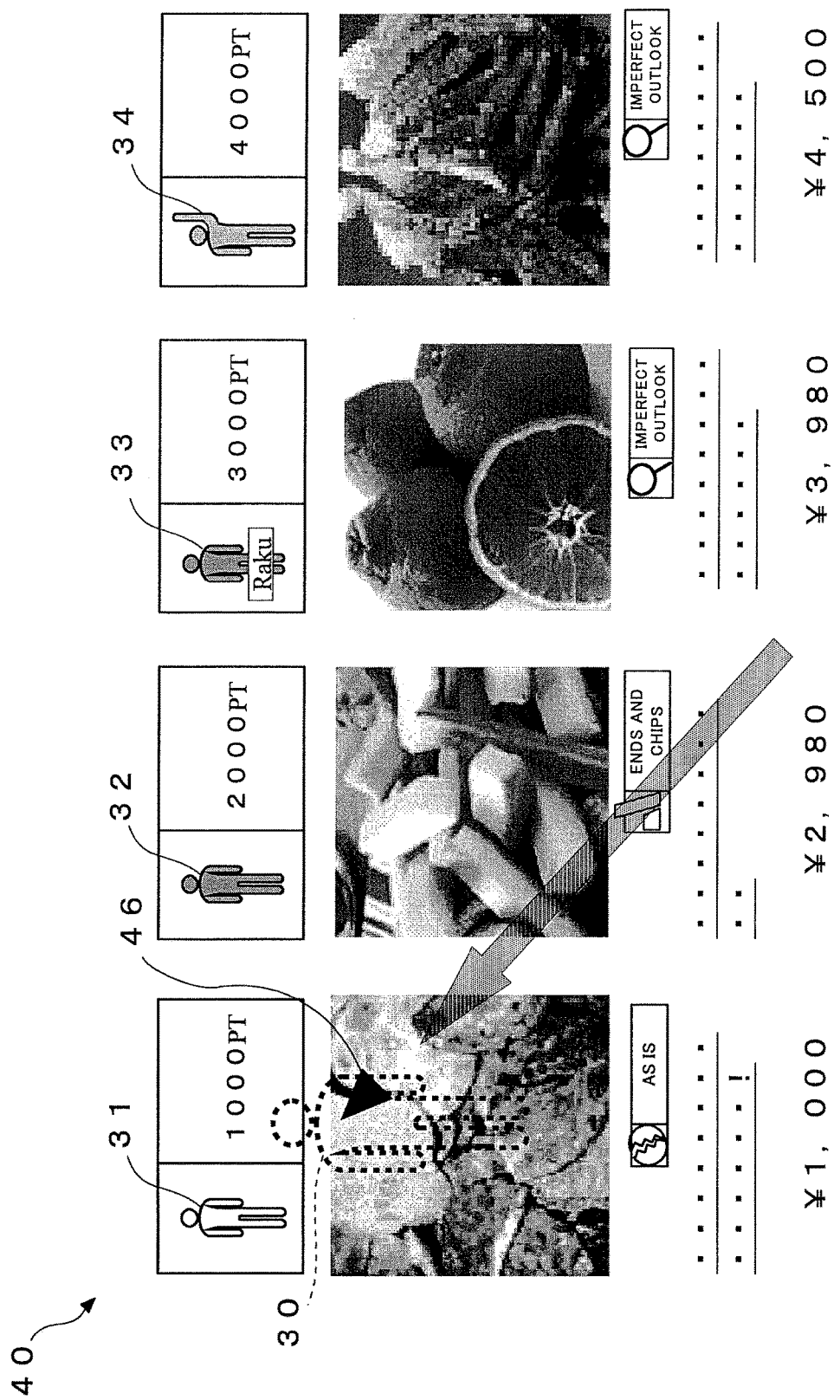
FIG. 7 illustrates a schematic diagram that illustrates an example of a web page displayed on the user terminal in FIG. 1.
Figure 8:
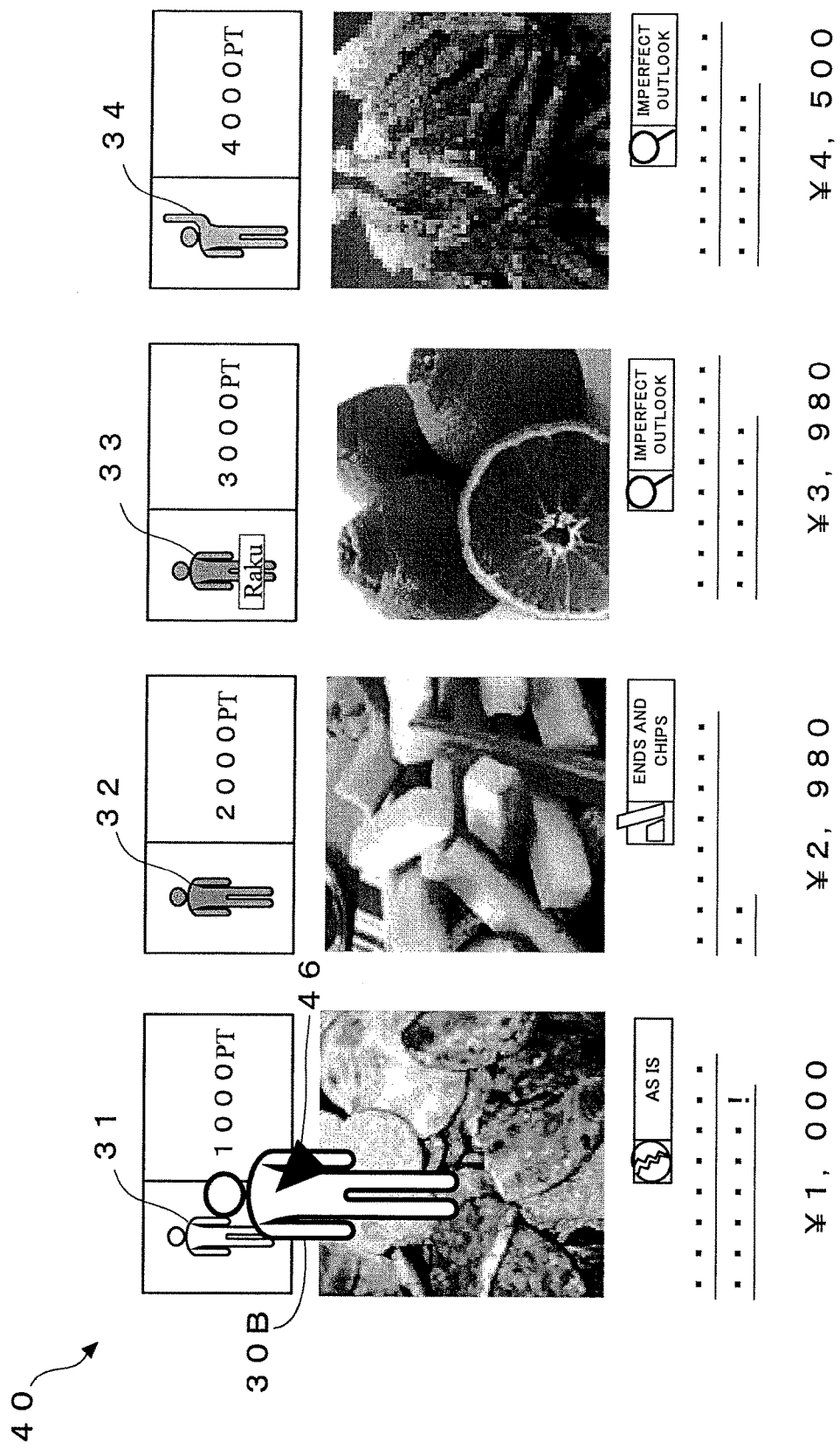
FIG. 8 illustrates a schematic diagram that illustrates an example of a web page displayed on the user terminal in FIG. 1.

FIG. 4 is a flowchart that illustrates an operation example of the information processing system 1. FIGS. 5 and 7 are schematic diagrams that illustrate examples of web pages displayed on the user terminal 20. FIG. 6 is a schematic diagram that illustrates an example of a table which illustrates an image object of each member stored in the member DB 12b. FIG. 8 is a schematic diagram that illustrates an example of a payment procedure screen displayed on the user terminal 20.

As illustrated in FIG. 4, the shopping server 10 accepts user's log-in (step S1). More specifically, when the user opens a log-in screen of the shopping site, inputs a log-in ID and a password and clicks a submit button using the user terminal 20, information of the log-in ID and the password is transmitted from the user terminal 20 to the shopping server 10. Further, the system control unit 14 of the shopping server 10 receives and authenticates the log-in ID and the password from the user terminal 20, and allows an access if the password is correct.

Next, the shopping server 10 acquires purchase history information of the user and user attributes (step S2). More specifically, the system control unit 14 of the shopping server 10 specifies a user ID from the log-in ID based on the member DB 12b, and acquires purchase history information (for example, information of points assigned as an example of a benefit for purchase of a product, information of a purchased product (a purchase date, a product name, the purchased amount, and the number of purchased products), information of the sum of purchase amounts in the past and statistical information related to purchase) and the user attributes associated with the user ID from the member DB 12b. The system control unit 14 of the shopping server 10 functions as an example of a purchase history information acquiring means that acquires purchase history information related to a product purchased by a user, from a storage means that stores the purchase history information. Further, the system control unit 14 of the shopping server 10 functions as an example of a point information acquiring means that acquires point information by acquiring information related to points assigned to a product purchased by the user as point information.

Next, the shopping server 10 acquires an image object indicating a display mode which changes in response to purchase history information (step S3). More specifically, the system control unit 14 of the shopping server 10 selects a series of image objects which correspond to, for example, the sex and which change in response to purchase history information such as a value of points, from the image object 12*c* based on, for example, the sex and the age of the user of the user attributes. Meanwhile, as illustrated in FIG. 5, a series of image objects include, for example, an image object 30 which changes a mode in response to a point value and the purchased amount, and image objects (obtainment image objects) 31, 32, 33 and 34. In addition, the system control unit 14 of the shopping server 10 generates, for example, an image object indicating a display mode in response to point information, an image object based on user attributes, an image object having a shape in response to the point information and an image object having a color in response to the point information as image objects (obtainment image objects) in advance, and stores these image objects in the image object DB 12*c*.

Meanwhile, the image object 30 is an image object of a default state (an image object number is "0"), and shows only an outline by a dotted line and allows an existence of a human shape such as the image object 31 of the image object number "1" or the image object 32 of the image object number "2" to be foreseen. The image object of the default state indicates whether points are not yet assigned or points reach a predetermined value. Further, the image object 31 has a clearer outline than the image object 30 and is displayed when, for example, the points reach 1000 points. Furthermore, the image object 32 is displayed when a color is added to the image object 31 and, for example, points reach 200 points. Still further, the image object 33 is displayed when a nickname is given to the image object 31 and, for example, points reach 3000 points. Moreover, the image object 34 is made by adding a variation of an operation of an image object to the image object 32 or the image object 33. Further, for example, the image object 34 may flash.

Further, the system control unit 14 of the shopping server 10 acquires an image object indicating a display mode in response to the acquired point information from a series of image objects in the image object DB 12*c*. When the user does not have points, or when points do not reach a predetermined point value, the system control unit 14 of the shopping server 10 acquires the image object 30 of the default state.

As described above, the system control unit 14 of the shopping server 10 functions as an example of an image object generating means that generates an image object indicating a display mode which changes in response to purchase history information. Further, the system control unit 14 of the shopping server 10 functions as an example of an image object generating means that generates an image object indicating a display mode in response to point information. Furthermore, the system control unit 14 of the shopping server 10 functions as an example of an image object generating means that generates an image object based on user attributes. Still further, the system control unit 14 of the shopping server 10 functions as an example of an image object generating means that generates an image object having a shape in response to point information which is an example of purchase history information. Moreover, the system control unit 14 of the shopping server 10 functions as an example of an image object generating means that generates an image object having a color in response to point information. Further, the system control unit 14 of the shopping server 10 functions as an example of an image object generating means that generates an image object which adopts a display mode of the default state.

Next, the user who has logged in searches for a product in a search page of a shopping site, and clicks a portion including link information of a web page including a specific product group. Further, the system control unit 14 of the shopping server 10 receives a product search request or a request of a web page from the user terminal 20. For example, as illustrated in FIG. 5, when a request of displaying a web page 40 including a specific product group is made, the system control unit 14 of the shopping server 10 specifies each product displayed on the web page 40 based on the product DB 12*a* and acquires point information assigned to a user when each product is purchased.

Next, when the user purchases a product, the shopping server 10 acquires an obtainment image object obtained in response to purchase history information such as earning points of a product to be purchased (step S4). More specifically, as illustrated in FIG. 5, the system control unit 14 of the shopping server 10 acquires obtainment image objects 31, 32, 33 and 34 in response to the sum of points earned by the user when a product is purchased and points which the user currently has, from the image object DB 12*c* in association with each product identified from a product image 41 listed on the web page 40 displayed on the display unit 23 of the user terminal 20.

As described above, the system control unit 14 of the shopping server 10 functions as an example of an obtainment image object generating means that generates an obtainment image object which is the image object acquired in response to purchase history information in case that a user purchases a product shown on a web page, or an example of an obtainment image object generating means that generates an obtainment image object which is the image object acquired in response to points assigned to the purchased product in case that a user purchases a product identified based on a product image included in a web page.

Next, the system control unit 14 of the shopping server 10 generates the web page 40 in which the product image 41, the image object 30 and the obtainment image objects 31, 32, 33 and 34 are embedded, and transmits the web page 40 to the user terminal 20 through the communication unit 11. The system control unit 14 of the shopping server 10 transmits the generated web page 40 to the user terminal 20 to display on the display unit 23 of the user terminal 20. As described above, the system control unit 14 of the shopping server 10 functions as an example of a web page generating means that generates a web page on which an image object is displayed. Further, the system control unit 14 of the shopping server 10 functions as an example of a web page generating means that generates a web page on which an image object and obtainment image objects are displayed together with a product image. Furthermore, the system control unit 14 of the shopping server 10 functions as an example of a transmitting means that transmits a web page to a terminal device through the network.

In addition, as illustrated in FIG. 6, in the member DB 12*b*, records of an image object number of an image object in response to the current number of points, a product ID of a product presented to a user and a price corresponding to the product ID are associated with a user ID. The system control unit 14 of the shopping server 10 reads the image object number, the product ID of the product and a price of the product of an image object to be displayed on the web page 40 as illustrated in FIG. 5, from these records based on the user ID of the user who has logged in in step S1. The system control unit 14 of the shopping server 10 reads the image object displayed on the web page 40 from the image object DB 12*c* based on the image object number. Further, the system control unit 14 of the shopping server 10 reads, for example, the obtainment image objects 31, 32, 33 and 32 from the image object DB 12*c* based on the price of the product corresponding to the product ID and the image object number.

Furthermore, the table shown in FIG. 6 is updated to reflect purchase history information, for example, once a day or when a user purchases a product.

Next, the user terminal 20 displays a product image and an image object (step S5). More specifically, the system control unit 26 of the user terminal 20 receives the web page 40 in which the product image 41, the image object 30 and the obtainment objects 31, 32, 33 and 34 are embedded, from the shopping server 10 to display on the display unit 23. As described above, the system control unit 26 of the user terminal 20 functions as an example of a display means that causes a web page displayed to be displayed on a terminal, or an example of a display means that causes an image object and obtainment image objects to be displayed on a web page together with a product image.

Next, the image object 30 is moved (step S6). More specifically, when generating the web page 40, the system control unit 14 of the shopping server 10 embeds a script or HTML description for moving the image object 30 on the web page 40, in the web page 40 based on an input from the operation unit 24 of the user terminal 20. Further, the system control unit 14 of the shopping server 10 transmits the image object 30 to the user terminal 20 through the communication unit 11 to move the image object 30 on the web page 40. The system control unit 26 of the user terminal 20 moves the image object 30 based on an input from the operation unit 24 based on a script or a HTML tag of the web page 40.

For example, using the mouse of the operation unit 24, the user moves a pointer 45 on the display unit 23 to an area of the image object 30, for example, clicks the left button of the mouse to change the pointer 45 to a pointer 46, and drags the image object 30 on the web page 40 as illustrated in FIG. 7. In addition, when the pointer 45 enters the area of the image object 30 without clicking, the image object 30 may be moved.

As described above, the system control unit 14 of the shopping server 10 functions as an example of an image object moving means that moves an image object on a web page based on an input from the operation unit of the user terminal. Further, the system control unit 26 of the user terminal 20 functions as an example of an image object moving means that moves an image object on a web page based on an input from the operation unit of the user terminal.

Figure 9:
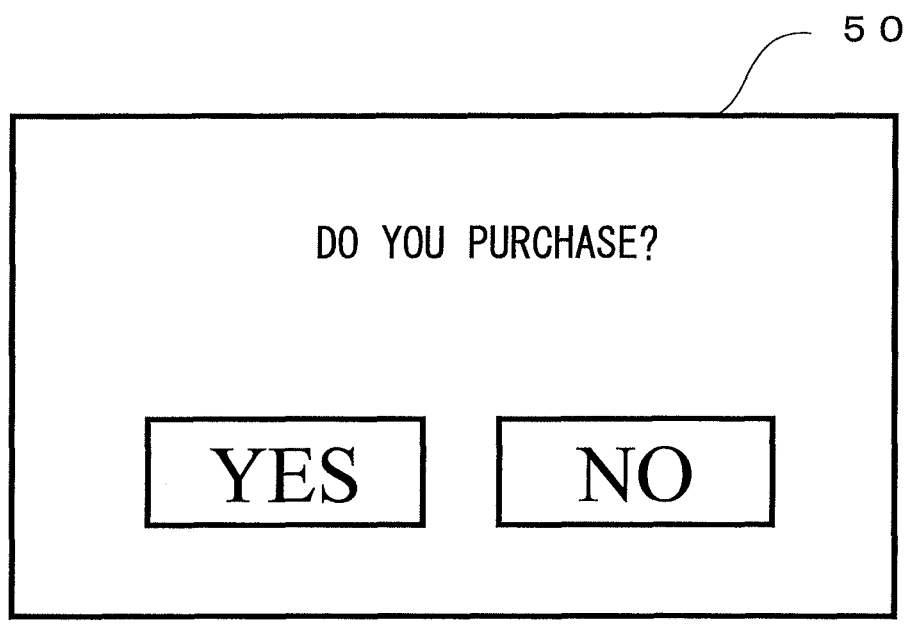
FIG. 9 illustrates a schematic diagram that illustrates an example of a payment procedure screen displayed on the user terminal in FIG. 1.

Next, processing related to a product purchase procedure is started when the image object 30 is moved, for example, to the product image 41 (step S7). For example, a product corresponding to the product image 41 is registered in the to-purchase list, or processing of the product purchase procedure is performed based on overlapping of the image object 30 and display areas of product related information. More specifically, when generating the web page 40, the system control unit 14 of the shopping server 10 registers a product associated with the product image 41 in the to-purchase list such as a shopping cart when the display area of the image object 30 and the display area of the product image 41 which is an example of product related information overlap as illustrated in FIG. 8, and embeds in the web page 40 a script or HTML description for opening a product purchase page 50 as illustrated in FIG. 9. Further, when the display area of the image object 30 and the display area of the product image 41 overlap on the web page 40, based on, for example, the script or a HTML tag of the web page 40, the system control unit 26 of the user terminal 20 causes a product to be registered in the to-purchase list or causes the product purchase page 50 to be displayed on the display unit 23 to start processing related to the purchase procedure.

In addition, information related to a product may be the obtainment image objects 31, 32, 33 and 34. Further, a product purchase procedure may be started without opening the product purchase page 50 from the next purchase. Furthermore, when the display area of the image object 30 and display areas of the obtainment image objects 31, 32, 33 and 34 overlap, a display mode of the image object 30 may change to the same image object 30B as the obtainment image object 31. In this case, it becomes clear that the display areas of the obtainment image objects 31, 32, 33 and 34 overlap, and when points area assigned, it is possible to clearly show to the user to which image object an image object changes. Further, in this case, without displaying the obtainment image objects 31, 32, 33 and 34 which are predicted to be obtained in response to purchase history information on the web page 40 from the first, the image object 30 may be changed to the image object 30B when the image object 30 is moved, for example, to the product image 41.

As described above, the system control unit 14 of the shopping server 10 or the system control unit 26 of the user terminal 20 functions as an example of a purchase procedure transitioning means that makes transition to a product purchase procedure when at least a part of a display area of an image object and a display area of information related to a product overlap on a web page. Further, the system control unit 14 of the shopping server 10 or the system control unit 26 of the user terminal 20 functions as an example of a product registering means that registers a product in the to-purchase list when an image object moves to an obtainment image object. Furthermore, the system control unit 14 of the shopping server 10 or the system control unit 26 of the user terminal 20 functions as an example of a purchase procedure transitioning means that makes transition to a product purchase procedure when at least apart of display areas of an image object and obtainment image objects overlap.

Next, the shopping server 10 settles a product purchase (step S8). More specifically, the user proceeds to the next purchase procedure by selecting "YES" of a confirmation button of the product purchase page 50, and the system control unit 14 of the shopping server 10 acquires payment information of, for example, an address and credit card number of the user from the member DB 12*b* and settles a product purchase after user's confirmation.

Next, an image object is changed in response to determined points (step S9). More specifically, the system control unit 14 of the shopping server 10 settles a product purchase, determines points at the point of time when the user pays money and changes the image object 30 to one display mode of the obtainment image objects 31, 32, 33 and 34 according to the assigned points. Upon log-in, the changed image object is displayed.

As described above, with the present embodiment, by acquiring purchase history information related to a product purchased by a user, from the product DB 12*a* which stores the purchase history information, acquiring the image object 30 indicating a display mode which changes in response to the purchase history information and causing the image object to be displayed on the web page 40 displayed on the user terminal 20, it is possible to recognize the purchase history information related to the purchase history of the user for which an image is created when the user purchases the product. Further, by this means, it is possible to purchase the product while looking at the purchase history information of the user for which the image is created.

Furthermore, by acquiring the obtainment image objects 31, 32, 33 and 34 which are image objects obtained in response to purchase history information in a case that the user purchases a product shown on a web page, and causing the image object and the obtainment image objects to be displayed on the web page 40, the user can also enjoy a change of the image object to the obtainment image object and, consequently, it is possible to promote sales of a product for the user.

Still further, by acquiring information related to points assigned to a product purchased by a user as point information, acquiring the image object 30 indicating a display mode in response to the point information, acquiring image objects obtained in response to the points assigned to the purchased product as the obtainment image objects 31, 32, 33 and 34 when the user purchases the product identified based on the product image 41 included in the web page 40, and causing the image object 30 and the obtainment image object 31 to be displayed on a web page together with the product image 41, the user can purchase the product and obtain the points and, at the same time, also enjoy a change of the image object 30 to the obtainment object and, consequently, it is possible to promote sales of a product for the user. Moreover, by displaying the points and the obtainment image objects 31, 32, 33 and 34 obtained according to the points in combination, it is possible to promote purchase of a next product.

Further, by acquiring point information related to points assigned to a product purchased by the user as purchase history information and acquiring the image object 30 indicating a display mode which changes in response to the point information, it is possible to purchase the product while recognizing the points obtained by purchasing the product through the image object 30.

Furthermore, when the image object 30 is acquired based on user attributes, it is possible to make the user have an attachment to the image object 30, give the motivation of growing the image object 30 to, for example, the obtainment image objects 31, 32, 33 or 34 using the image object 30 having the user attributes, and promote sales of the product for the user. Still further, the image object 30 having the user attributes can give a realistic sensation as if users were talking each other.

Moreover, when the image object 30 moves to the product image 41 and changes to the image object 30B (obtainment image object), and this obtainment image object is displayed on a web page without displaying from the beginning on the web page 40 the obtainment image objects 31, 32, 33 and 34 which are predicted to be obtained in response to purchase history information, the user can enjoy a change from an image object to an obtainment image object and, consequently, promote sales of the product for the user.

When an image object having a shape in response to point information or an image object having a color in response to purchase history information of point information is acquired, the user can enjoy a change of the shape o the color according to the purchase history information such as the point information, and it is possible to promote sales of the product for the user.

When an image object which adopts a display mode of the default state is acquired, even in case of, for example, the first user or insufficient points, the image object 30 which adopts the display mode of the default state allows a change to, for example, the image objects 31, 32, 33 or 34 to be foreseen, so that the user can enjoy the change and it is possible to promote sales of the product for the user.

When an image object is moved to a product image of a product, for example, when an image object is moved on the web page 40 based on an input from the operation unit 24 of the user terminal 20 and at least part of a display area of the image object and a display area of information related to the product overlap on the web page, or when the image object is moved to the obtainment image object, if the product is registered in a to-purchase list or a procedure proceeds to a product purchase procedure, a user's operation is facilitated and a dramatic expression for the user is increased, so that it is possible to improve user's convenience and promote sales of the product for the user. Further, the image object is dragged, and the product is specified by dropping the image object in a product image to proceed to a procedure related to purchase of the product.

When at least part of display areas of an image objects and an obtainment image object overlap on the web page 40 and then a procedure proceeds to a product purchase procedure, it is possible to clarify user's intension of acquiring the obtainment image object by a user's operation of dragging and overlaying the image object 30 to and on, for example, the obtainment image object 31.

Further, according to the present embodiment, by acquiring point information by acquiring information related to points assigned to a product purchased by a user as point information, acquiring the image object 30 indicating a display mode in response to the point information, displaying the product image 41 which enables identification of the product and the image object 30 on the web page 40, moving the image object 30 on the web page 40 based on an input from the operation unit 24 of the user terminal 20, and proceeding to a product purchase procedure when the display area of the image object 30 and a display area of information related to the product (for example, the obtainment image object 31 or the product image 41), a user's operation is facilitated and a dramatic expression for the user increases, so that it is possible to improve user's convenience, and promote sales of the product for the user.

[4. Modified Example of Web Page and Image Object]

(4.1 Modified Example of Web Page)

Figure 10:
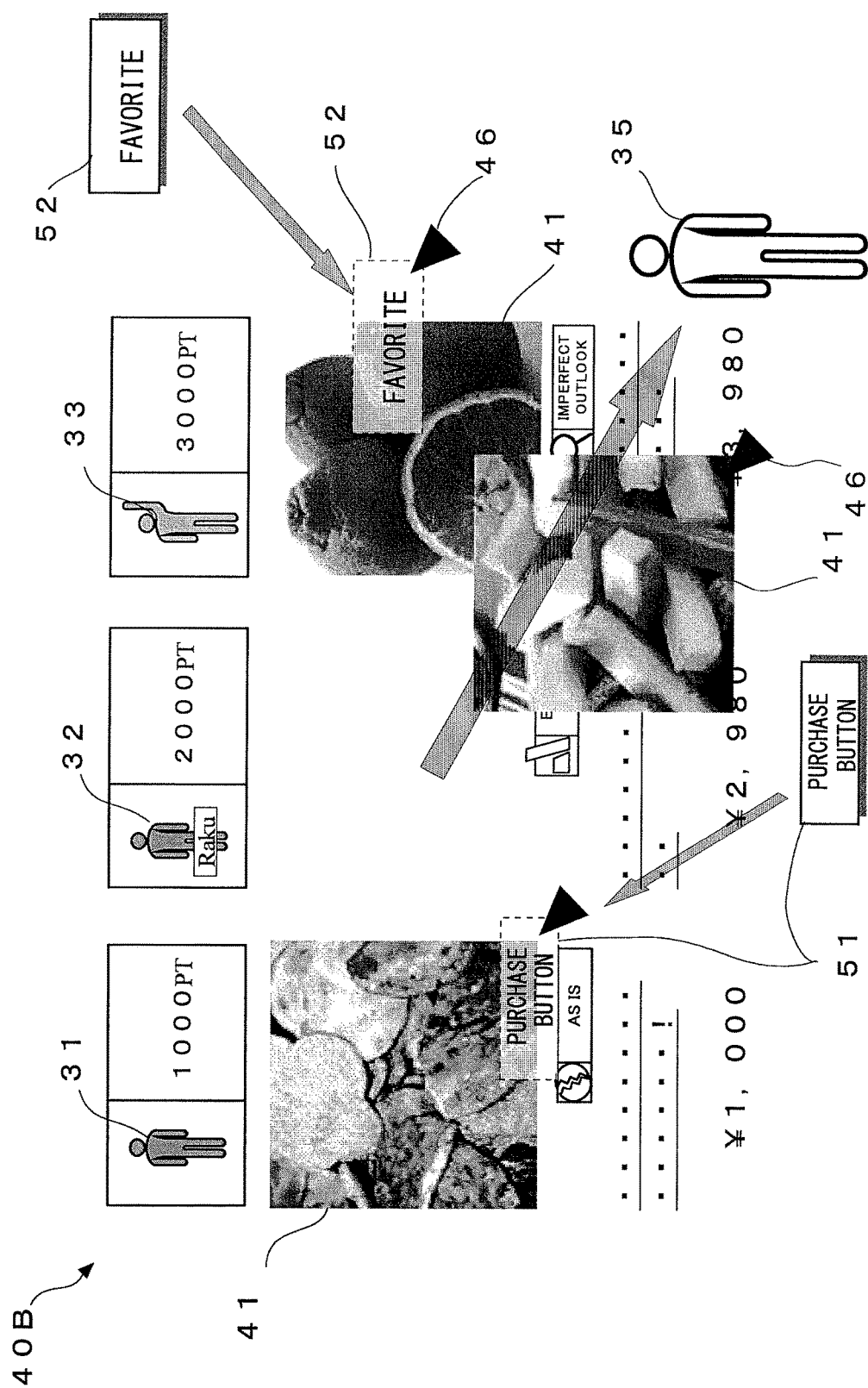
FIG. 10 illustrates a schematic diagram that illustrates a modified example of a web page displayed on the user terminal in FIG. 1.

Next, a web page displayed on the user terminal 20 will be described using FIG. 10. FIG. 10 is a schematic diagram that illustrates a modified example of a web page displayed on the user terminal 20.

In step S6, the product image 41 may be moved instead of moving the image object 30. For example, as illustrated in FIG. 10, the product image 41 is dragged toward the image object 35 on a web page 40B based on a user's input from the operation unit 24.

Further, as in step S7, when the product image 41 moves to the image object 35, and a display area of the image object 35 and the display area of the product image 41 overlap, for example, the product purchase page 50 is opened, or a product shown by the product image 41 is registered in the to-purchase list like a favorite list. As described above, the system control unit 26 of the user terminal 20 functions as an example of a product image moving means that moves the product image 41 included in the web page on the web page 40B based on an input from the operation unit 24 of the user terminal 20. Further, the system control unit 26 of the user terminal 20 functions as an example of a product registering means that registers a product shown by a product image, in the to-purchase list when the product image 41 moves to the image object 35.

Furthermore, as illustrated in FIG. 10, a purchase button image 51 for proceeding to processing of a product purchase procedure, or a favorite button image 52 for registering a product shown by the product image 41 in the to-purchase list may be moved toward the product image 41. Still further, as in step S7, when the purchase button image 51 or the favorite button image 52 moves to the product image 41, and a display area of the purchase button image 51 or the favorite button image 52 and a display area of the product image 41 overlap, for example, the product purchase page 50 is opened.

As described above, when a product image included in a web page is moved on the web page based on an input from an operation unit of a user terminal and the product image moves to an image object, if a product shown by the product image is registered in a to-purchase list, a user's operation is facilitated and a dramatic expression for the user increases, so that it is possible to improve user's convenience, and promote sales of the product for the user.

(4.2 Modified Example of Image Object)

Next, deformation of an image object will be described using FIGS. 11 to 14. FIGS. 11 to 14 illustrate schematic diagrams that illustrate modified examples of image objects.

Figure 11:
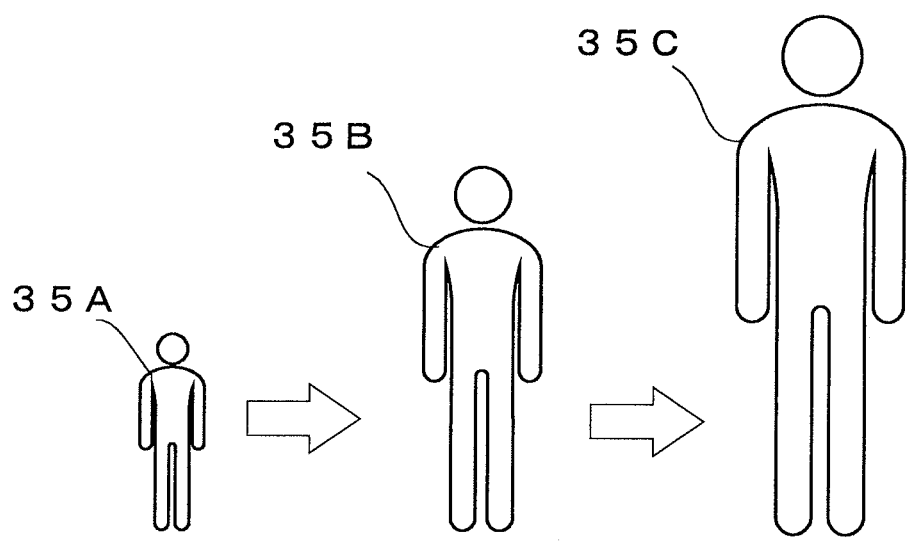
FIG. 11 illustrates a schematic diagram that illustrates a modified example of an image object.

As illustrated in FIG. 11, an image object may change as an obtainment image object according to the purchased amount or obtained points which is an example of purchase history information as the size of the image object (an example of a shape in response to purchase history information) changes similar to image objects 35A, 35B and 35C.

Figure 12:
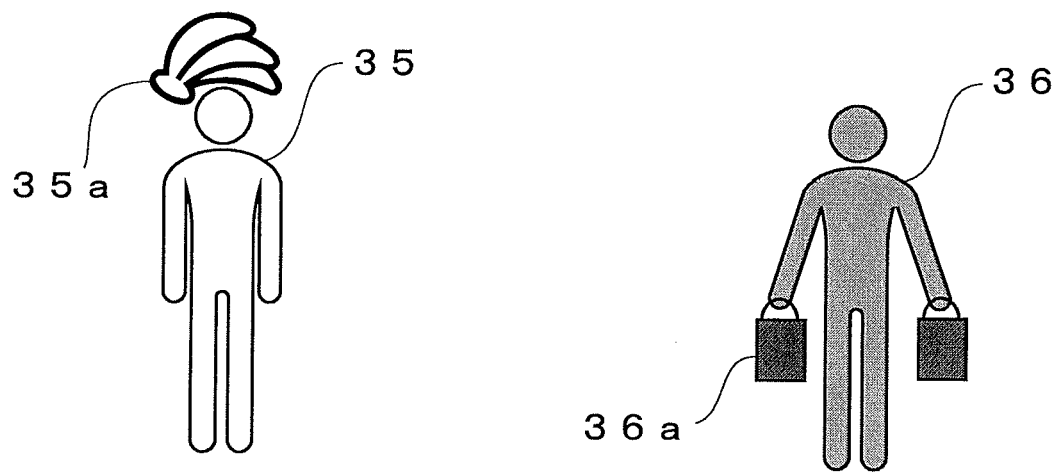
FIG. 12 illustrates a schematic diagram that illustrates a modified example of an image object.

Next, as illustrated in FIG. 12, as an example of the shape of the image object in response to purchase history information, an image 35a imitating a purchased product may be attached to the image object 35, and a color of the image object 35 may change to a color which represents a product of the image 35a. Further, an image 36a imitating a shopping bag may be attached to the image object 36 according to the number or the quantity of purchased products. Furthermore, points earned by the user may be displayed together with an image object. When, for example, an image object moves to a product image, the image 35a may be attached to the image object, or a color of the image object may be distinguished. Thus, when the image object to which an image imitating a product purchased by the user is acquired as an image object indicating a display mode which changes in response to purchase history information, the user can visually recognize a purchased product.

In addition, the system control unit 14 of the shopping server 10 or the system control unit 26 of the user terminal 20 reads the image 35a imitating a product associated with a product ID based on the product ID as illustrated in the table in FIG. 6, from the memory unit 12 or the memory unit 22, and attaches the image 35a to the image object 35.

Figure 13:
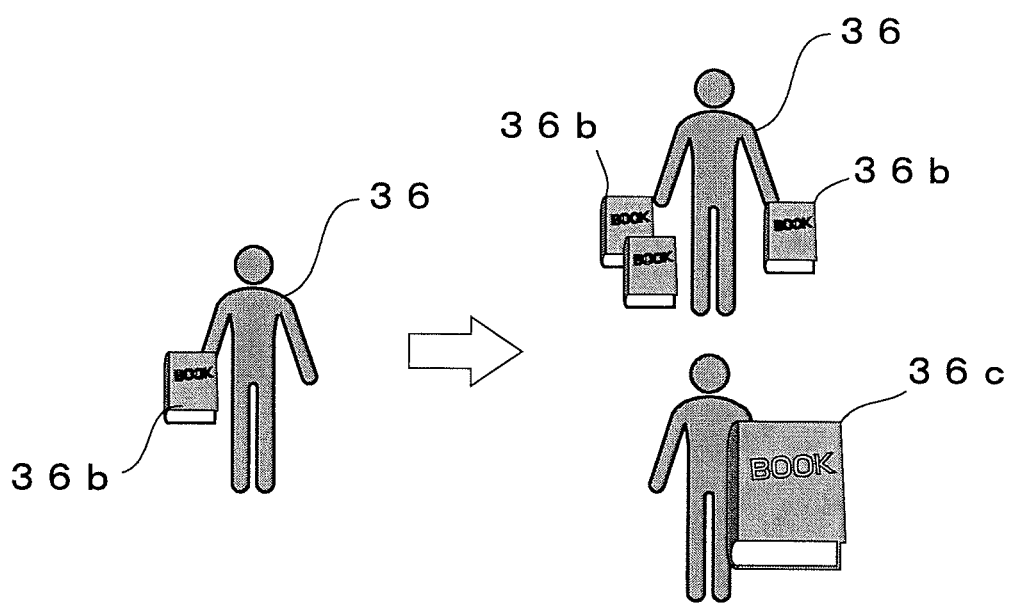
FIG. 13 illustrates a schematic diagram that illustrates a modified example of an image object.

Further, as illustrated in FIG. 13, as an example of a shape of an image object in response to purchase history information, a book 36b which is an example of a product purchased by a user may be attached to the image object 36 in response to the number of purchases or the purchased amount. Furthermore, when the number of purchases or the purchased amount is a predetermined value or more, the shape of a product to attach may change like a book 36c.

In addition, purchase history information related to a product displayed on a web page among various products purchased by a user may be reflected in an image object, or purchase history information related to a product related to a product category in the web page which the user is browsing may be reflected in the image object. Further, a product which the user has purchased the most frequently in purchase history information may be reflected in an image object.

Figure 14:
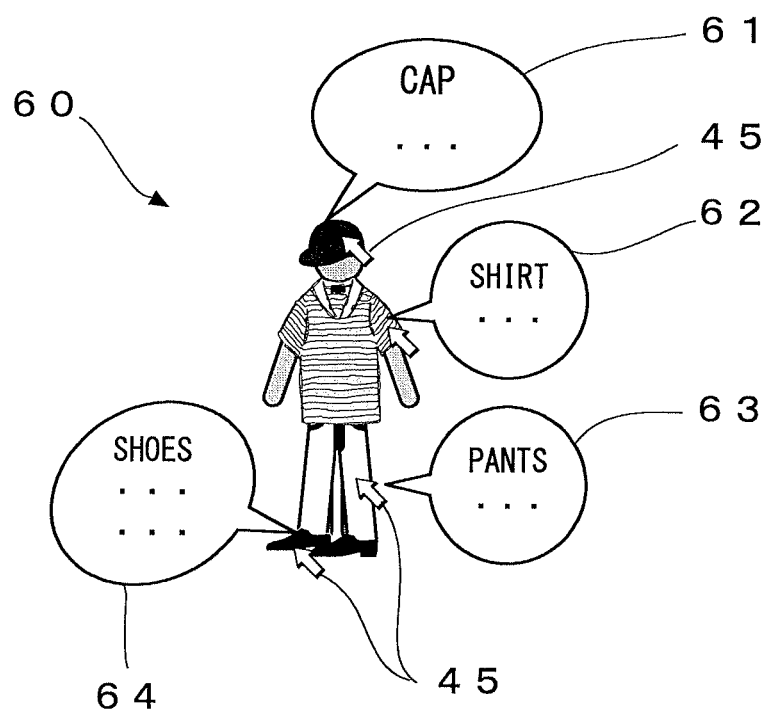
FIG. 14 illustrates a schematic diagram that illustrates a modified example of an image object.

Next, as illustrated in FIG. 14, a plurality portions partitioned from an image object 60 are associated with related information of a product purchased by a user or the like. The above portions indicate, for example, units configuring the image object 60. More specifically, the portions correspond to a head part, a body part, foot parts and leg parts of the image object 60. Further, in the above case, when the pointer 45 is placed close to each portion, each of balloon displays 61, 62, 63 and 64 is displayed. Meanwhile, a product comment related to the head part of the image object 60 having a human shape is displayed in the balloon display 61, a product comment related to the body part of the image object 60 having a human shape is displayed in the balloon display 62, a product comment related to the leg parts of the image object 60 having a human shape is displayed in the balloon display 63, and a product comment related to the foot parts of the image object 60 having a human shape is displayed in the balloon display 64. When an image object is acquired which is partitioned into a plurality of portions each of which is associated with user attribute information, multiple pieces of information can be more easily presented to a user. In addition, although the above portions are described as the head part, the body part, the leg parts and the foot parts, these portions may be set as the upper body or the lower body of the image object 60, or may be set as more detailed units than the head part, the body part, the leg parts and the foot parts. Further, the number of portions may be changed in response to the number of types of products purchased by the user.

Thus, purchase history information is visualized, so that the user can visually recognize a product which the user is purchasing.

(4.3 Modified Example of Web page)

Figure 15:
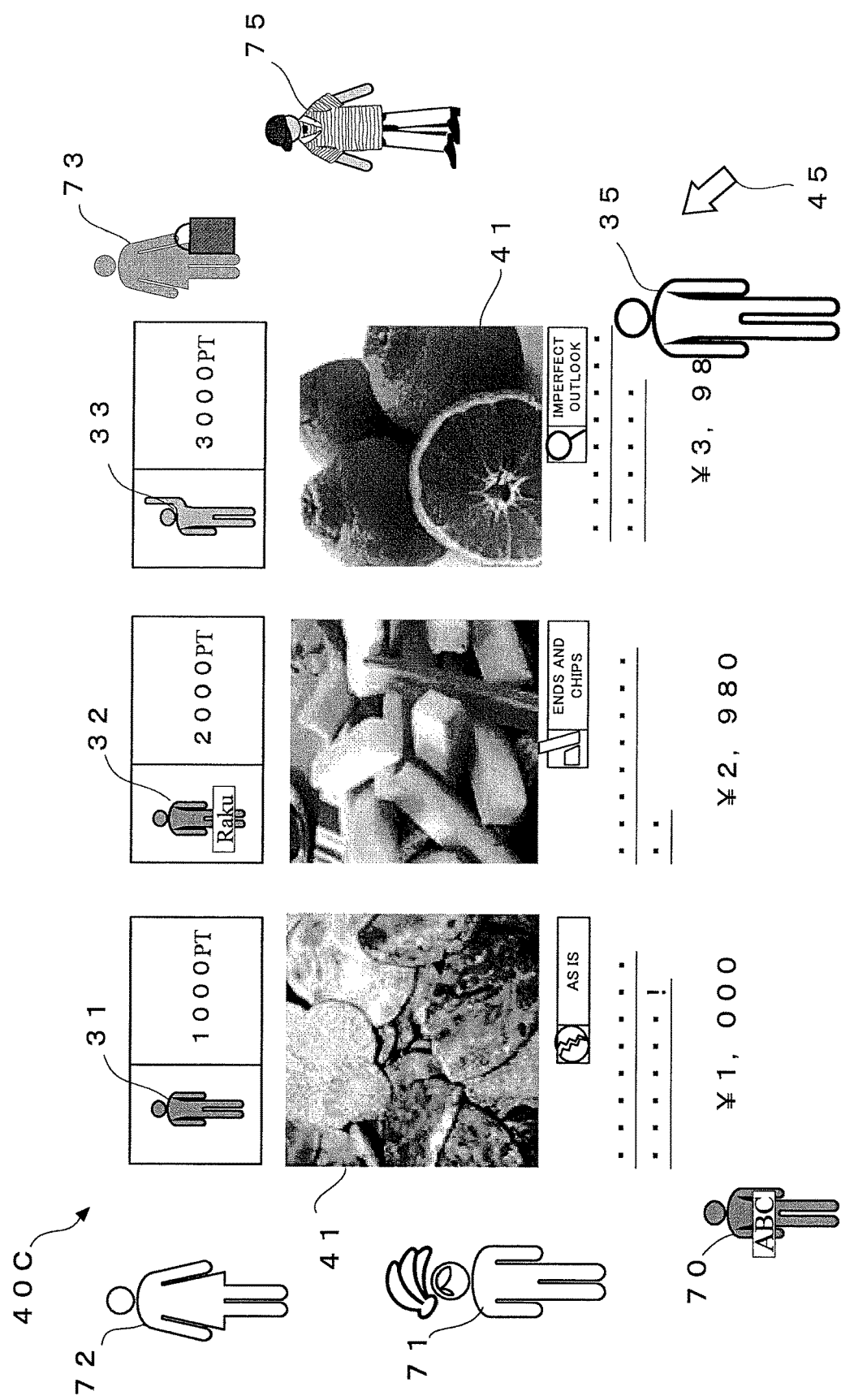
FIG. 15 illustrates a schematic diagram that illustrates a modified example of a web page displayed on the user terminal in FIG. 1.

Next, a case will be described using FIG. 15 where a plurality of image objects is displayed on a web page. FIG. 15 is a schematic diagram that illustrates a modified example of a web page displayed on the user terminal 20.

As illustrated in FIG. 15, image objects 60, 70, 71, 72 and 73 corresponding to other users may be displayed on a web page 40C in addition to the image object 35 corresponding to the user of the user terminal 20. A purchase history or user attributes of each users who are strangers is reflected in each of the image objects 60, 70, 71, 72 and 73. For example, the image object 60 adopts a mode wearing, for example, purchased products. The image object 70 adopts a mode in response to, for example, the purchased amount or the number of obtained points. The image object 71 adopts a mode with a purchased product attached. The image object 72 adopts a mode in response to user attributes such as the sex. The image object 73 adopts a mode in response to the user attributes such as the sex, and adopts a mode with a shopping bag. In this case, the user who is browsing the web page 40C can visually recognize a purchase tendency as to what other users have purchased.

Further, a mode such as the number of image objects to be displayed or the shape of an image object may be changed in response to the time. For example, the number of image objects to be displayed is changed in response to the current number of users who are logging in a shopping site. It is possible to present what other users purchase in the same time zone, and promote a purchase of a product for a user who is browsing the web page 40c.

In addition, the number of image objects to be displayed may correspond to the number of people who is logging in a shopping site, or the number related to people who is logging in the shopping site. Further, the number of image objects to be displayed may be narrow down to the number of users who are logging in a specific category of the shopping site, the number of users who are browsing the web page 40C, and the number of users who belong to the same group as friends of users who are browsing the web page 40C.

In addition, even if the user does not currently log in the shopping site, an image object of the user who belongs to the same group as, for example, friends of the user who is browsing the web page 40C may be displayed on the web page 40C. Further, even if the user does not currently log in the shopping site, an image object corresponding to the user who has purchased a product or logged in a shopping site in a predetermined time in the past may be displayed on the web page 40C.

In addition, when the image objects 70, 71, 72, 73 and 75 move to, for example, the product image 41, or when the product image 41 moves to the image objects 60, 70, 71, 72 and 73, the image objects 60, 70, 71, 72 and 73 may change in response to purchase history information in case that other people buy a product associated with the product image 41. In this case, it is possible to recognize a mode of a predicted change of image objects of other people, and enjoy this change by recommending a product from one user to the other users. Further, by displaying image objects of other users, it is possible to visually recognize the purchase tendency of other people as to how many other people log in the shopping site, and how many people browse the same web page or what product the other people purchase.

Furthermore, when image objects of other users are also displayed and the image objects 60, 70, 71, 72 and 73 are pointed by, for example, the pointer 45, the user may be allowed to write a message for other users.

Still further, an image object of a character which the user selects may be used in addition to an image object based on user attributes.

Moreover, by further assigning points in response to a product category used by a user, an image object which adopts a display mode may be acquired in response to the product category. Meanwhile, a product category may be a category set to a given product group or may be each service at a shopping site which provides various services as an upper level category. When an image object is acquired which adopts a display mode in response to a product category used by the user, it is possible to promote sales of a product of a different category. Further, it is possible to provide, for example, an obtainment image object 31 equally for users who do not focus on a specific category.

Furthermore, a deadline may be set to an image object to display points required to maintain a current state of an image object or display, for example, a recommended product.

Still further, by acquiring point information which a user currently holds, from the shopping server 10, and acquiring or generating an image object indicating a display mode in response to point information and an obtainment image object in response to points earned when the user purchases a product of a product image displayed on the display unit 23, the system control unit 26 of the user terminal 20 may display a product image, and the image object and the obtainment image object on the display unit 23.

As described above, the system control unit 26 of the user terminal 20 functions as an example of a point information acquiring means that acquires point information by acquiring information related to points assigned to a product purchased by a user as the point information. Further, the system control unit 26 of the user terminal 20 functions as an example of an image object acquiring means that acquires an image object indicating a display mode which changes in response to purchase history information or an example of an image object acquiring means that acquires an image object indicating a display mode in response to point information. Furthermore, the system control unit 26 of the user terminal 20 functions as an example of an obtainment image object acquiring means that acquires an obtainment image object which is the image object obtained in response to purchase history information in case that a user purchases a product shown on a web page, or an example of an obtainment image object acquiring means that acquires an obtainment image object which is the image object obtained in response to points assigned from a purchased product in case that the user purchases a product identified based on a product image included in the web page.

Still further, when payment information is stored, for example, in the memory unit of the user terminal 20 and the display area of the image object 30 and a display area of product related information overlap, the user terminal 20 may transmit the payment information to the shopping server 10. The payment information may be associated with the image object 30 itself.

Further, when the display unit 23 is a display panel of a touch switch system such as a touch panel, an image object or a product image may be moved by the user's finger instead of the pointer 45.

When a plurality of products are purchased or a plurality of products are selected, an image object in response to the sum of money or an image object in response to points to be obtained may be displayed on a web page. Thus, when there is a plurality of products, a plurality of product images may be attached to an image object as illustrated in FIG. 13. Consequently, for example, when a plurality of products is selected, it is possible to attach a plurality of predictable obtainment image objects to an image object, and present the image object to the user.

Figure 16:
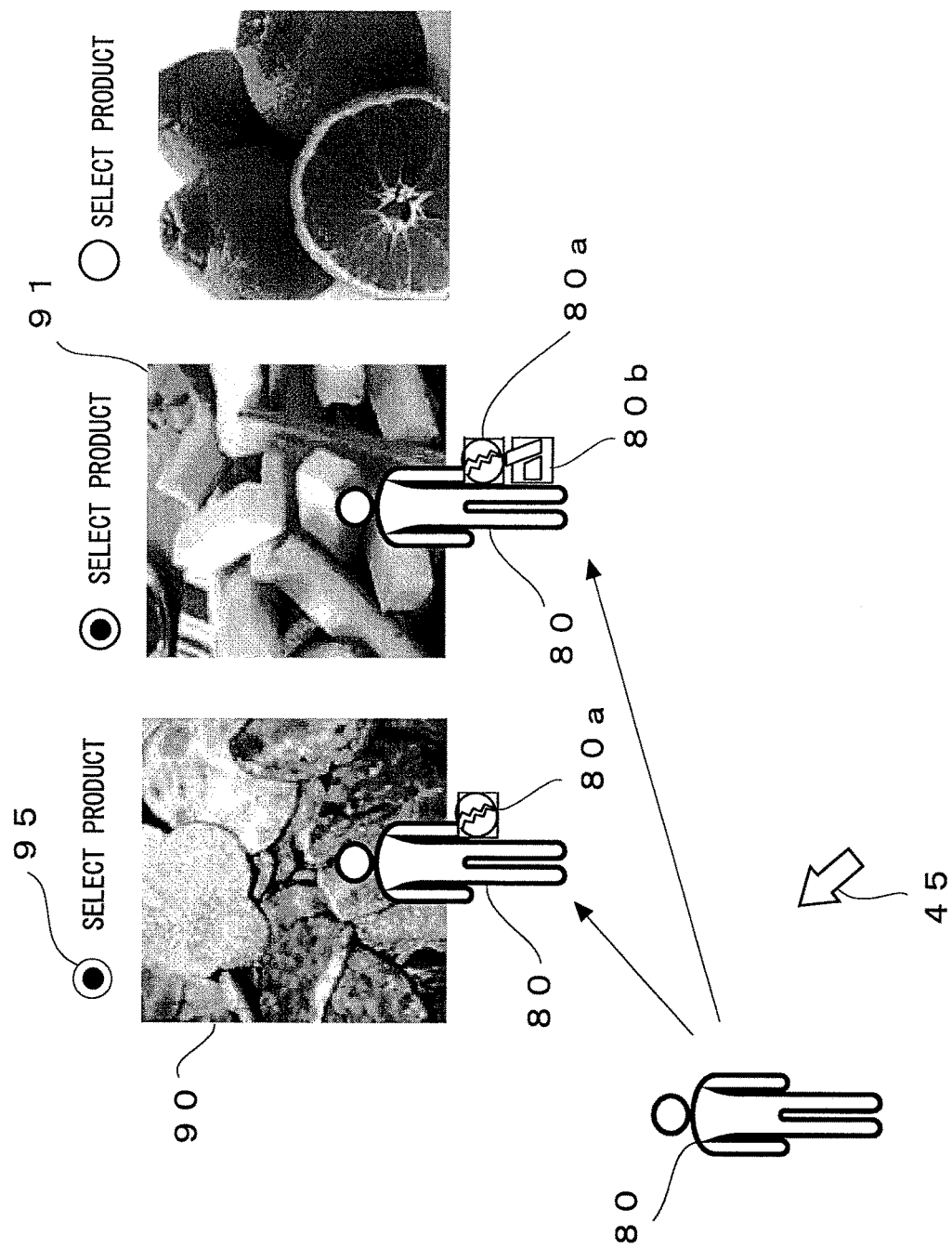
FIG. 16 illustrates a schematic diagram that illustrates a modified example of a web page displayed on the user terminal in FIG. 1.

When, for example, an image object 80 is dragged to a product image 90 as illustrated in FIG. 16, an image 80a imitating a product of the product image 90 is attached to the image object 80. Subsequently, when the image object 80 is moved to a next product image 91 in this state, an image 80b imitating a product of the product image 91 is attached to the image object 80 in addition to the image 80a. In addition, by selecting a plurality of product images, images (for example, the images 80a and 80b) imitating a plurality of products may be attached to the image object 80. A method of selecting a plurality of product images may include, for example, specifying the product image using the pointer 45, and selecting, for example, another product image 91 by, for example, clicking the product image 91 using the mouse in a state where, for example, a control key is pressed. Alternatively, as illustrated in FIG. 16, radio buttons 95 corresponding to a plurality of product images 90 to be selected may be activated and selected. Alternatively, for example, a plurality of product images 90 to be selected may be collectively selected by the pointer 45. Further, the image 80a may be attached to the image object 80 after a product is purchased, and the image 80b is then attached to the image object 80 to which the image 80a is attached after the next product is purchased.

Furthermore, when, for example, points becomes five folds by purchasing two or more products, if two products are selected or purchased, an image object which has acquired five-fold points may be displayed. Particularly when points become five folds only by purchasing two or more products, if two products are selected, an image object which has obtained five-fold points by purchasing these two products may be accurately reflected as a predicted image object which changes after the purchase, instead of a predicted image object which reflects points obtained by purchasing the two products simply based on normal points. By this means, the user can make a purchasing action by recognizing a predicted image object which is intuitively and accurately obtained without complicated point calculation.

Further, as an example of an image object indicating a display mode which changes in response to purchase history information, instead of attaching a product image, the balloon displays 61, 62, 63 and 64 illustrated in FIG. 13 may be attached to an image object without attaching a product image to the image object.

When bonus points such as "five-fold points" are offered for a sales promotion, an image object which reflects the magnification of points may be displayed. For example, members are classified into silver members, gold members and premium members in order from the lowest points in response to points obtained so far as illustrated in FIG. 17, and an image object represents a member rank (a silver member, a gold member and a premium member) of a user. In a case illustrated in FIG. 18, a user's rank is currently a silver member, and the image object 80 represents a silver member. Further, when a product of a product image 91 is purchased, five-fold points can be acquired, and, when a product of a product image 92 is purchased, 10-fold points can be acquired.

Under these circumstances, a magnification of points of each product can be accurately reflected with the present modified example, and, even if the product of the product image 91 and the product of the product image 92 have the same price, the image object 80 which has moved to the product images 91 and 92 do not necessarily indicate the same predicted image object. That is, by moving the image object 80 to the product image 91, an image object 81 (for example, the image object 81 of the gold member) to which five-fold points of points for the product of the product image 91 have been added is displayed. Further, by moving the image object 80 to the product image 92, an image object 82 (for example, the image object 82 of a premium member) to which 10-fold points of points for the product of the product image 92 have been added is displayed.

The user can easily determine if the user becomes a premium member or a gold member by looking at the image objects 81 and 82 without making calculation in order to determine if the user becomes a premium member or a gold member by adding 5-fold points compared to normal points of a product in case of, for example, 5-fold points.

Further, the present invention is by no means limited to the above example. The above embodiment is an exemplary embodiment, and employs the substantially same configuration as a technical idea recited in the claims of the present invention, and all inventions having the same function and effect are incorporated within the technical scope of the present invention.

EXPLANATION OF REFERENCE NUMERALS

3: NETWORK
10: SHOPPING SERVER (INFORMATION PROCESSING DEVICE)
11: COMMUNICATION UNIT
12: MEMORY UNIT
12*a*: PRODUCT DB
12*b*: MEMBER DB
12*c*: IMAGE OBJECT DB
14: SYSTEM CONTROL UNIT
20: USER TERMINAL (TERMINAL DEVICE, INFORMATION PROCESSING DEVICE)
21: COMMUNICATION UNIT
22: MEMORY UNIT
23: DISPLAY UNIT
24: OPERATION UNIT
26: SYSTEM CONTROL UNIT
30, 35, 36, 60, 70, 71, 72, 73, 75: IMAGE OBJECT
31, 32, 33, 34: OBTAINMENT IMAGE OBJECT

The invention claimed is:

1. An information processing system comprising:
   at least one non-transitory memory operable to store program code;
   a storage operable to store purchase history information corresponding to a plurality of users, product information for a plurality of products and a plurality of image objects, wherein the product information includes point information, price information and point magnification information; and
   at least one processor configured to access the at least one non-transitory memory, read the program code and operate as instructed by the program code, the program code including:
      purchase history information acquiring code that is configured to cause at least one of the at least one processor to acquire the purchase history information of a user, from the storage operable to store the purchase history information corresponding to the plurality of users;
      image object generating code that is configured to cause at least one of the at least one processor to generate an image object indicating a display mode which corresponds to the purchase history information of the user, wherein the purchase history information of the user includes information corresponding to at least one of a plurality of purchased products, a purchased amount, a quantity of the at least one of the plurality of purchased products, and point information;
      obtainment image object generating code that is configured to cause at least one of the at least one processor to:
         generate an obtainment image object for each of a plurality of products displayed on a web page, wherein each of the generated image obtainment objects is obtained according to the purchase history information of the user, and
         in response to a selection by the user of a product of the plurality of products displayed on the web page, the obtainment image object generating code is configured to cause the at least one of the at least one processor to:
         i) dynamically update the obtainment image object according to a predicted purchase of the selected product, wherein the predicted purchase history information is calculated based on a membership status of the user obtained from the storage, first price information of the selected product obtained from the purchase history information of the user, first point information of the selected product obtained from the purchase history information of the user and point magnification information of the selected product, and ii) dynamically acquire an obtainment image of the selected product from the storage, wherein the dynamic obtainment image of the selected product is based on the first price information, the first point information and the point magnification information; and web page generating code that is configured to cause at least one of the at least one processor to generate the web page displaying the image object, the plurality of products, and the dynamic obtainment image of the selected product, wherein the predicted purchase information is made without further calculations and communications, wherein the dynamic obtainment image is displayed next to the selected product, and multiple pieces of purchase information are embedded on each of the image object and the dynamic obtainment image object on the web page, the embedding occurs by embedding at least one of at least one product image imitating the purchased products, at least one color of the product image, at least one shape of the purchased products, at least one shopping bag image imitating a shopping bag based on the quantity of purchased products, and shopping points earned by the user.

2. The information processing device according to claim 1, wherein the program code further includes point information acquiring code that causes the at least one processor to acquire the point information, which is assigned to a purchase history of the user, as the purchase history information, wherein the image object generating code is further configured to cause the at least one processor to generate an image object indicating a display mode which changes according to the point information.

3. The information processing device according to claim 1, wherein the image object generating code is further configured to cause the at least one processor to generate an image object comprising a shape in response to the purchase history information.

4. The information processing device according to claim 1, wherein the image object generating code is further configured to cause the at least one processor to generate an image object including a color in response to the purchase history information.

5. The information processing device according to claim 1, wherein the image object generating code is further configured to cause the at least one processor to, if the user has purchased at least one product, generate an image object to which an image imitating the at least one product is added, as the image object indicating a display mode which changes in response to the purchase history information.

6. The information processing device according to claim 1, wherein the image object generating code is further configured to cause the at least one processor to generate an image object based on attributes of the user.

7. The information processing device according to claim 1, wherein the image object generating code is further configured to cause the at least one processor to generate the image object which represents a display mode of a default state.

8. The information processing device according to claim 1, wherein the image object generating code is further configured to cause the at least one processor to generate an image object which represents a display mode in response to a product category used by the user.

9. The information processing device according to claim 1, wherein the program code further includes product registering code that is configured to cause the at least one processor to register a product of the plurality of products in a to-purchase list, when the image object moves on the web page to a product image of the product on the web page, based on an input from an operation unit of the terminal device.

10. The information processing device according to claim 1, wherein the program code further includes product registering code that is configured to cause the at least one processor to register a product of the plurality of products in a to-purchase list, when the image object moves on the web page to the corresponding one of the obtainment image objects on the web page, based on an input from an operation unit of the terminal device.

11. An information processing method of processing information in an information processing device, executed by at least one processor, the information processing method comprising:

acquiring purchase history information of a user, from a storage operable to store purchase history information corresponding to a plurality of users, product information for a plurality of products and a plurality of image objects, wherein the product information includes point information, price information and point magnification information;

generating an image object indicating a display mode which corresponds to the purchase history information of the user, wherein the purchase history information of the user includes information corresponding to at least one of a plurality of purchased products, a purchased amount, a quantity of the at least one of the plurality of purchased products, and point information;

generating an obtainment image object for each of a plurality of products displayed on a web page, wherein each of the generated image obtainment objects is obtained according to the purchase history information of the user;

in response to a selection by the user of a product of the plurality of products displayed on the web page:
i) dynamically updating the obtainment image object according to a predicted purchase of the selected product, wherein the predicted purchase history information is calculated based on a membership status of the user obtained from the storage, first price information of the selected product obtained from the purchase history information of the user, first point information of the selected product obtained from the purchase history information of the user and point magnification information of the selected product, and
ii) dynamically acquiring an obtainment image of the selected product from the storage, wherein the dynamic obtainment image of the selected product is based on the first price information, the first point information and the point magnification information; and generating the web page displaying the image object, the plurality of products, and the dynamic obtainment image of the selected product, wherein the predicted purchase information is made without further calculations and communications, wherein the dynamic obtainment image is displayed next to the selected product, and multiple pieces of purchase information are embedded on each of the image object and the dynamic obtainment image object on the web page, the embedding occurs by embedding at least one of at least one product image imitating the purchased products, at least one color of the product image, at least one shape of the purchased products, at least one shopping bag image imitating a shopping bag based on the quantity of purchased products, and shopping points earned by the user.

12. An information processing system comprising:

an information processing device that processes information; and a storage operable to store purchase history information corresponding to a plurality of users, product information for a plurality of products and a plurality of image objects, wherein the product information includes point information, price information and point magnification information; and a terminal device that connects to the information processing device through a network, wherein the information processing device comprises:
- at least one non-transitory memory operable to store program code; and
- at least one processor configured to access the at least one non-transitory memory, read the program code and operate as instructed by the program code, the program code including:
- purchase history information acquiring code that is configured to cause at least one of the at least one processor to acquire the purchase history information of a user, from the storage operable to store the purchase history information corresponding to the plurality of users;
- image object generating code that is configured to cause at least one of the at least one processor to generate an image object indicating a display mode which corresponds to the purchase history information of the user, wherein the purchase history information of the user includes information corresponding to at least one of a plurality of purchased products, a purchased amount, a quantity of the at least one of the plurality of purchased products, and point information;
- obtainment image object generating code that is configured to cause at least one of the at least one processor to:
  - generate an obtainment image object for each of a plurality of products displayed on a web page, wherein each of the generated image obtainment objects is obtained according to the purchase history information of the user, and
  - in response to a selection by the user of a product of the plurality of products displayed on the web page, the obtainment image object generating code is configured to cause the at least one of the at least one processor to:
    - i) dynamically update the obtainment image object according to a predicted purchase of the selected product, wherein the predicted purchase history information is calculated based on a membership status of the user obtained from the storage, first price information of the selected product obtained from the purchase history information of the user, first point information of the selected product obtained from the purchase history information of the user and point magnification information of the selected product, and
    - ii) dynamically acquire an obtainment image of the selected product from the storage, wherein the dynamic obtainment image of the selected product is based on the first price information, the first point information and the point magnification information; and
- web page generating code that is configured to cause at least one of the at least one processor to generate the web page displaying the image object, the plurality of products, and the dynamic obtainment image of the selected product, wherein the predicted purchase information is made without further calculations and communications, wherein
  - the dynamic obtainment image is displayed next to the selected product, and
  - multiple pieces of purchase information are embedded on each of the image object and the dynamic obtainment image object on the web page, the embedding occurs by embedding at least one of at least one product image imitating the purchased products, at least one color of the product image, at least one shape of the purchased products, at least one shopping bag image imitating a shopping bag based on the quantity of purchased products, and shopping points earned by the user.

13. A non-transitory computer-readable storage medium having an information processing program recorded thereon which causes a computer to:
- acquire purchase history information of a user, from a storage operable to store purchase history information corresponding to a plurality of users, product information for a plurality of products and a plurality of image objects, wherein the product information includes point information, price information and point magnification information;
- generate an image object indicating a display mode which corresponds to the purchase history information of the user, wherein the purchase history information of the user includes information corresponding to at least one of a plurality of purchased products, a purchased amount, a quantity of the at least one of the plurality of purchased products, and point information;
- generate an obtainment image object for each of a plurality of products displayed on a web page, wherein each of the generated image obtainment objects is obtained according to the purchase history information of the user;
- in response to a selection by the user of a product of the plurality of products displayed on the web page:
  - i) dynamically update the obtainment image object according to a predicted purchase of the selected product, wherein the predicted purchase history information is calculated based on a membership status of the user obtained from the storage, first price information of the selected product obtained from the purchase history information of the user, first point information of the selected product obtained from the purchase history information of the user and point magnification information of the selected product, and
  - ii) dynamically acquire an obtainment image of the selected product from the storage, wherein the dynamic obtainment image of the selected product is based on the first price information, the first point information and the point magnification information; and
- generate the web page displaying the image object, the plurality of products, and the dynamic obtainment image of the selected product, wherein the predicted purchase information is made without further calculations and communications, wherein
the dynamic obtainment image is displayed next to the selected product, and
multiple pieces of purchase information are embedded on each of the image object and the dynamic obtainment image object on the web page, the embedding occurs by embedding at least one of at least one product image imitating the purchased products, at least one color of the product image, at least one shape of the purchased products, at least one shopping bag image imitating a shopping bag based on the quantity of purchased products, and shopping points earned by the user.

14. The non-transitory computer-readable storage medium according to claim 13, further comprising moving the image object on the web page based on an input from an operation unit of the terminal device,
wherein the displaying comprises, when the image object moves to a product image of a product of the plurality of products in the moving the image object, displaying the corresponding one of the obtainment image objects on the web page.

15. The non-transitory computer-readable storage medium according to claim 13, further causing the computer to:
move the image object on the web page based on an input from an operation unit of the terminal device; and
when the image object moves to a product image of a product of the plurality of products in the moving the image object moving, register the product in a to-purchase list.

16. The non-transitory computer-readable storage medium according to claim 13, further causing the computer to:
move the image object on the web page based on an input from an operation unit of the terminal device; and
when the image object moves to an obtainment image object of the obtainment image objects in the moving the image object, register the corresponding one of the plurality of products in the to-purchase list.

17. The non-transitory computer-readable storage medium according to claim 13, further causing the computer to:
move a product image included in the web page on the web page based on an input from an operation unit of the terminal device; and
when the product image moves to the image object in the moving the image object, register a product shown by the product image in a to-purchase list.

18. The non-transitory computer-readable storage medium according to claim 13, further comprising acquiring the point information, which is assigned to a purchase history of the user, as the purchase history information,
wherein the image object acquiring comprises acquiring an image object indicating a display mode which changes according to the point information.

19. The non-transitory computer-readable storage medium according to claim 13, wherein the image object acquiring comprises acquiring an image object comprising a shape in response to the purchase history information.

20. The non-transitory computer-readable storage medium according to claim 13, wherein the image object acquiring comprises acquiring an image object comprising a color in response to the purchase history information.

21. The non-transitory computer-readable storage medium according to claim 13, wherein if the user has purchased at least one product, the image object acquiring comprises acquiring, as an image object indicating a display mode which changes according to the purchase history information, the image object to which an image imitating the at least one product is added.

22. The non-transitory computer-readable storage medium according to claim 13, wherein the image object acquiring comprises acquiring an image object based on attributes of the user.

23. The non-transitory computer-readable storage medium according to claim 13, wherein the image object acquiring comprises acquiring the image object which adopts a display mode of a default state.

24. An information processing method of processing information in an information processing device, executed by at least one processor, the information processing method comprising:
acquiring purchase history information of a user, from a storage operable to store purchase history information corresponding to a plurality of users, product information for a plurality of products and a plurality of image objects, wherein the product information includes point information, price information and point magnification information;
acquiring an image object indicating a display mode which corresponds to the purchase history information of the user, wherein the purchase history information of the user includes information corresponding to at least one of a plurality of purchased products, a purchased amount, a quantity of the at least one of the plurality of purchased products, and point information;
acquiring an obtainment image object for each of a plurality of products displayed on a web page, wherein each of the generated image obtainment objects is obtained according to the purchase history information of the user;
in response to a selection by the user of a product of the plurality of products displayed on the web page:
i) a server dynamically updates the obtainment image object according to a predicted purchase of the selected product, wherein the predicted purchase history information is calculated based on a membership status of the user obtained from the storage, first price information of the selected product obtained from the purchase history information of the user, first point information of the selected product obtained from the purchase history information of the user and point magnification information of the selected product, and
ii) the server dynamically acquires an obtainment image of the selected product from the storage, wherein the dynamic obtainment image of the selected product is based on the first price information, the first point information and the point magnification information; and
information processing device displays a web page, wherein the server generates the web page displaying the image object, the plurality of products, and the dynamic obtainment image of the selected product, wherein the predicted purchase information is made without further calculations and communications, wherein
the dynamic obtainment image is displayed next to the selected product, and
multiple pieces of purchase information are embedded on each of the image object and the dynamic obtainment image object on the web page, the embedding occurs by embedding at least one of at least one product image imitating the purchased products, at least one color of the product image, at least one shape of the purchased products, at least one shopping bag image imitating a shopping bag based on the quantity of purchased products, and shopping points earned by the user.

25. The information processing method according to claim 24, further comprising moving the image object on the web page based on an input from an operation unit of the terminal device,
   wherein the causing comprises, when the image object moves to a product image of a product of the plurality of products in the moving the image object, causing the corresponding one of the obtainment image objects to be displayed on the web page.

26. The information processing method according to claim 24, further comprising:
   moving the image object on the web page based on an input from an operation unit of the terminal device; and
   when the image object moves to a product image of a product of the plurality of products in the moving the image object, registering the product in a to-purchase list.

27. The information processing method according to claim 24, further comprising:
   moving the image object on the web page based on an input from an operation unit of the terminal device; and
   when the image object moves to an obtainment image object of the obtainment image objects in the moving the image object, registering the corresponding one of the plurality of products in the to-purchase list.

* * * * *